United States Patent
Kawai et al.

(10) Patent No.: US 9,160,990 B2
(45) Date of Patent: Oct. 13, 2015

(54) SOLID-STATE IMAGING DEVICE, IMAGING APPARATUS, AND DRIVING METHOD OF A SOLID-STATE IMAGING DEVICE

(71) Applicant: FUJIFILM Corporation, Tokyo (JP)

(72) Inventors: Tomoyuki Kawai, Saitama (JP); Mitsuru Okigawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/487,687

(22) Filed: Sep. 16, 2014

(65) Prior Publication Data

US 2015/0002635 A1    Jan. 1, 2015

Related U.S. Application Data

(63) Continuation of application No. PCT/JP2013/053035, filed on Feb. 8, 2013.

(30) Foreign Application Priority Data

Mar. 28, 2012   (JP) .................................. 2012-074310

(51) Int. Cl.
| | |
|---|---|
| H04N 9/04 | (2006.01) |
| H04N 9/07 | (2006.01) |
| H04N 5/369 | (2011.01) |
| H04N 13/02 | (2006.01) |
| H04N 5/374 | (2011.01) |
| H04N 5/232 | (2006.01) |

(52) U.S. Cl.
CPC ........... *H04N 9/045* (2013.01); *H04N 5/23212* (2013.01); *H04N 5/3696* (2013.01); *H04N 5/3741* (2013.01); *H04N 9/07* (2013.01); *H04N 13/021* (2013.01); *H04N 13/0207* (2013.01); *H04N 5/23206* (2013.01); *H04N 5/23293* (2013.01)

(58) Field of Classification Search
CPC ................................................. H04N 5/23206
See application file for complete search history.

(56) References Cited

U.S. PATENT DOCUMENTS

| | | | |
|---|---|---|---|
| 2006/0038904 A1 | 2/2006 | Kudoh | |
| 2009/0251556 A1 | 10/2009 | Mabuchi | |
| 2010/0128152 A1 | 5/2010 | Hayasaka et al. | |
| 2010/0253799 A1 | 10/2010 | Mabuchi | |

(Continued)

FOREIGN PATENT DOCUMENTS

| | | | |
|---|---|---|---|
| JP | 2000-197066 A | 7/2000 | |
| JP | 2001-250931 A | 9/2001 | |

(Continued)

OTHER PUBLICATIONS

International Search Report, issued in PCT/JP2013/053035, dated Mar. 12, 2013.

(Continued)

*Primary Examiner* — Dave Czekaj
*Assistant Examiner* — Berteau Joisil
(74) *Attorney, Agent, or Firm* — Birch, Stewart, Kolasch & Birch, LLP

(57) ABSTRACT

A solid-state imaging device 5 is equipped with sets of pixel cells 53(1)-53(4), each set assuming a Bayer arrangement. A G pixel cell 53(2) is located right-adjacent to a G pixel cell 53(1). A G pixel cell 53(3) is located bottom-adjacent to the G pixel cell 53(2). A G pixel cell 53(4) is located right-adjacent to the G pixel cell 53(3).

12 Claims, 19 Drawing Sheets

(56) References Cited

U.S. PATENT DOCUMENTS

2011/0019041 A1    1/2011    Ishiwata et al.
2011/0019043 A1    1/2011    Hamada

FOREIGN PATENT DOCUMENTS

| | | |
|---|---|---|
| JP | 2002-10276 A | 1/2002 |
| JP | 2006-54276 A | 2/2006 |
| JP | 2009-17152 A | 1/2009 |
| JP | 2009-273119 A | 11/2009 |
| JP | 2010-154493 A | 7/2010 |
| JP | 2011-29379 A | 7/2010 |
| JP | 2011-29291 A | 2/2011 |

OTHER PUBLICATIONS

Written Opinion of the International Searching Authority, issued in PCT/JP2013/053035, dated Mar. 12, 2013 with translation.

SOLID-STATE IMAGING DEVICE, IMAGING APPARATUS, AND DRIVING METHOD OF A SOLID-STATE IMAGING DEVICE

CROSS REFERENCE TO RELATED APPLICATION

This is a continuation of International Application No. PCT/JP2013/053035 filed on Feb. 8, 2013, and claims priority from Japanese Patent Application No. 2012-074310 filed on Mar. 28, 2012, the entire disclosures of which are incorporated herein by reference.

TECHNICAL FIELD

The present invention relates to a solid-state imaging device, an imaging apparatus, and a driving method of a solid-state imaging device.

BACKGROUND ART

In recent years, with the increase of the resolution of solid-state imaging devices such as CCD (charge-coupled device) image sensors and CMOS (complementary metal-oxide-semiconductor) image sensors, the demand for information apparatus having a shooting function such as digital still cameras, digital video cameras, cellphones, and PDAs (personal digital assistants) has increased rapidly. Such information apparatus having a shooting function will be referred to as imaging apparatus.

To realize high-image-quality still image shooting in such imaging apparatus, it is necessary to increase the number of pixel cells. On the other hand, to realize high-image-quality moving image shooting, it is necessary to increase the rate of signal reading from an imaging device.

However, when the number of pixel cells is increased, the number of signals to be read out increases and hence it becomes difficult to increase the reading rate. That is, to realize both of high-image-quality still image shooting and high-image-quality moving image shooting, it is necessary to simultaneously attain mutually contradictory objectives, that is, increase of both of the number of pixel cells and the signal reading rate.

Among known driving methods of an imaging device for increasing the signal reading rate are what is called pixels summation reading in which output signals of plural pixel cells are added together in an imaging device and a resulting signal is output and decimation reading in which signal reading pixel cells are determined through decimation.

For example, Patent documents 1 and 2 disclose imaging apparatus using an imaging device which employs Bayer-arranged blocks each consisting of four (2×2) pixel cells having the same color. Reading is performed by adding together signals of the pixel cells of each block.

PRIOR ART DOCUMENTS

Patent Documents

Patent document 1: JP-A-2002-10276
Patent document 2: JP-A-2009-17152

SUMMARY OF THE INVENTION

Problems to be Solved by the Invention

In the solid-state imaging device described in Patent documents 1 and 2, it is conceivable to add together output signals of two pixel cells arranged vertically or horizontally of each block. However, neither addition method can increase the resolution because imaging signals that are output from the solid-state imaging device assume a square lattice arrangement.

It is also conceivable to add together output signals of two diagonal pixel cells of each block. This addition method cannot increase the resolution either because addition result signals of each block are located at the same spatial position as before.

The present invention has been made in the above circumstances, and an object of the invention is therefore to provide an imaging apparatus which can realize both of high-image-quality moving image shooting and high-image-quality still image shooting.

Means for Solving the Problems

The invention provides a solid-state imaging device in which plural pixel cells including G pixel cells each including a photoelectric conversion element for detecting green light, R pixel cells each including a photoelectric conversion element for detecting red light, and B pixel cells each including a photoelectric conversion element for detecting blue light are arranged two-dimensionally, wherein the plural pixel cells are arranged in such a manner that pixel cell rows each consisting of plural pixel cells arranged in a row direction at a constant pitch are arranged in a column direction which is perpendicular to the row direction; odd-numbered pixel cell rows are deviated from even-numbered pixel cell rows in the row direction by the pixel cell arrangement pitch in the row direction; in each of a first pixel cell group consisting of pixel cells belonging to odd-numbered rows and a second pixel cell group consisting of pixel cells belonging to even-numbered rows, first pixel cell rows in each of which sets of two G pixel cells and sets of two R pixel cells are arranged alternately in the row direction and second pixel cell rows in each of which sets of two B pixel cells and sets of two G pixel cells are arranged alternately in the row direction are arranged alternately in the column direction; in each of the first pixel cell group and the second pixel cell group, among the pixel cells belonging to the second pixel cell rows, the G pixel cells are located at positions corresponding to positions of the respective R pixel cells belonging to the first pixel cell rows and the B pixel cells are located at positions corresponding to positions of the respective G pixel cells belonging to the first pixel cell rows; in each of a pair of first pixel cell rows that are adjacent to each other in the column direction and an a pair of second pixel cell rows that are adjacent to each other in the column direction, a pixel cell of the same kind as each pixel cell concerned is located at a position that is deviated in the row direction by the pixel cell arrangement pitch in the row direction and deviated in the column direction by the pixel cell arrangement pitch in the column direction from the pixel cell concerned; the pixel cell concerned and the pixel cell of the same kind as the pixel cell concerned constitute a pixel cell pair; and the solid-state imaging device comprises charge storage members which are provided so as to correspond to the respective pixel cells and store charges generated in the photoelectric conversion elements of the respective pixel cells, and signal output circuits which output signals corresponding to the charges stored in the respective pixel charge storage members, and the charge storage member and the signal output circuit corresponding to each pixel cell belonging to the first pixel cell group are commonized with the charge storage member and the signal output circuit corresponding to a pixel cell that is paired with the pixel cell belonging to the first pixel cell group, respectively.

With this configuration, even if a signal of each pixel cell belonging to the first pixel cell group and a signal of a pixel cell that is located at a position that is deviated in the row direction by the pixel cell arrangement pitch in the row direction and deviated in the column direction by the pixel cell arrangement pitch in the column direction from the pixel cell belonging to the first pixel cell group are added together, signals obtained by such additions do not have the same spatial position. Thus, it becomes possible to generate high-resolution shot image data.

When a signal of each pixel cell belonging to the first pixel cell group and a signal of a pixel cell that is located at a position that is deviated in the row direction by one pixel cell pitch are added together, a shot image signal having a honeycomb arrangement can be obtained. As a result, it becomes possible to generate high-resolution shot image data.

Performing the above additions within the solid-state imaging device makes it possible to increasing the reading rate of shot image signals.

Signals of each pixel cell belonging to the first pixel cell group and a pixel cell that is paired with the former can be added together in the form of charges, which makes it possible to high-sensitivity, low-noise shot image data. Furthermore, the reading rate of shot image signals can be increased.

Advantages of the Invention

The invention can provide an imaging apparatus which can realize both of high-image-quality moving image shooting and high-image-quality still image shooting.

MODES FOR CARRYING OUT THE INVENTION

Embodiments of the present invention will be hereinafter described with reference to the drawings.

Figure 1:
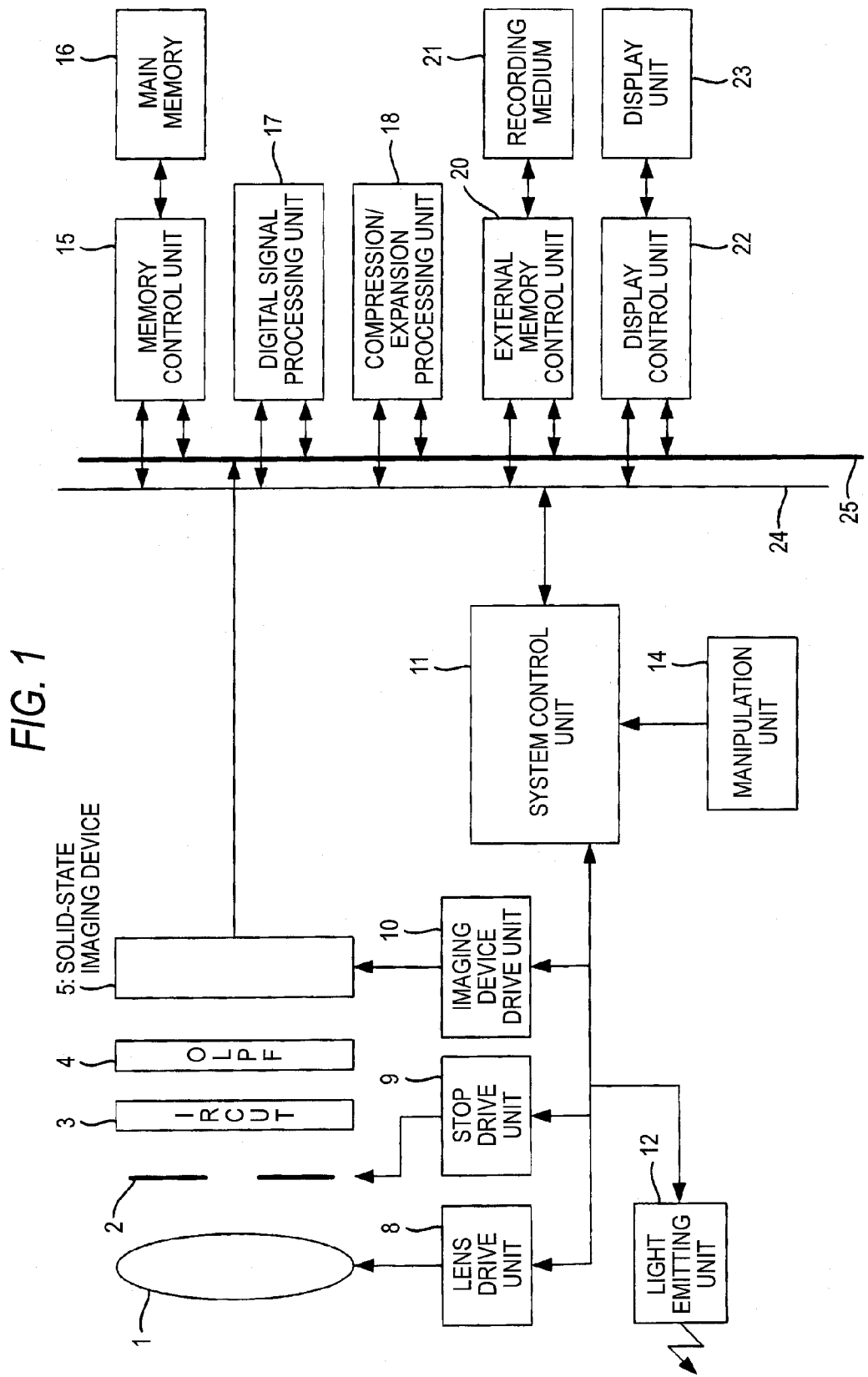
FIG. 1 shows a general configuration of a digital camera as an example imaging apparatus for description of an embodiment of the present invention.

FIG. 1 shows a general configuration of a digital camera as an example imaging apparatus for description of an embodiment of the invention.

An imaging system of the illustrated digital camera is equipped with a single imaging optical system 1 including a focus lens, a zoom lens, etc., a solid-state imaging device 5 such as a CCD image sensor or a CMOS image sensor, a stop 2 disposed between the imaging optical system 1 and the solid-state imaging device 5, an infrared cut filter 3, and an optical lowpass filter 4.

A system control unit 11 which supervises the entire electrical control system of the digital camera controls a flashing unit 12. The system control unit 11 controls a lens drive unit 8 to adjust the positions of the focus lens and the zoom lens which are included in the imaging optical system 1. The system control unit 11 also controls the aperture of the stop 2 via a stop drive unit 9 to perform exposure adjustment.

Furthermore, the system control unit 11 drives the solid-state imaging device 5 via an imaging device drive unit 10 to cause it to output a shot image signal representing a subject image taken through the imaging optical system 1. A user instruction is input to the system control unit 11 via a manipulation unit 14.

The electrical control system of the digital camera is equipped with a main memory 16, a memory control unit 15 connected to the main memory 16, a digital signal processing unit 17, a compression/expansion processing unit 18, an external memory control unit 20 to which a detachable recording medium 21 is connected, and a display control unit 22 to which a liquid crystal display unit 23 which is provided on the camera back side, for example, is connected.

The digital signal processing unit 17 performs interpolation calculation, gamma correction calculation, RGB/YC conversion processing, etc. on a shot image signal that is output from the solid-state imaging device 5 and thereby generates shot image data.

The compression/expansion processing unit 18 compresses shot image data generated by the digital signal processing unit 17 into a JPEG format and expands compressed image data.

The memory control unit 15, the digital signal processing unit 17, the compression/expansion processing unit 18, the external memory control unit 20, and the display control unit 22, which are connected to each other by a control bus 24 and a data bus 25, are controlled by commands issued from the system control unit 11.

Figure 2:
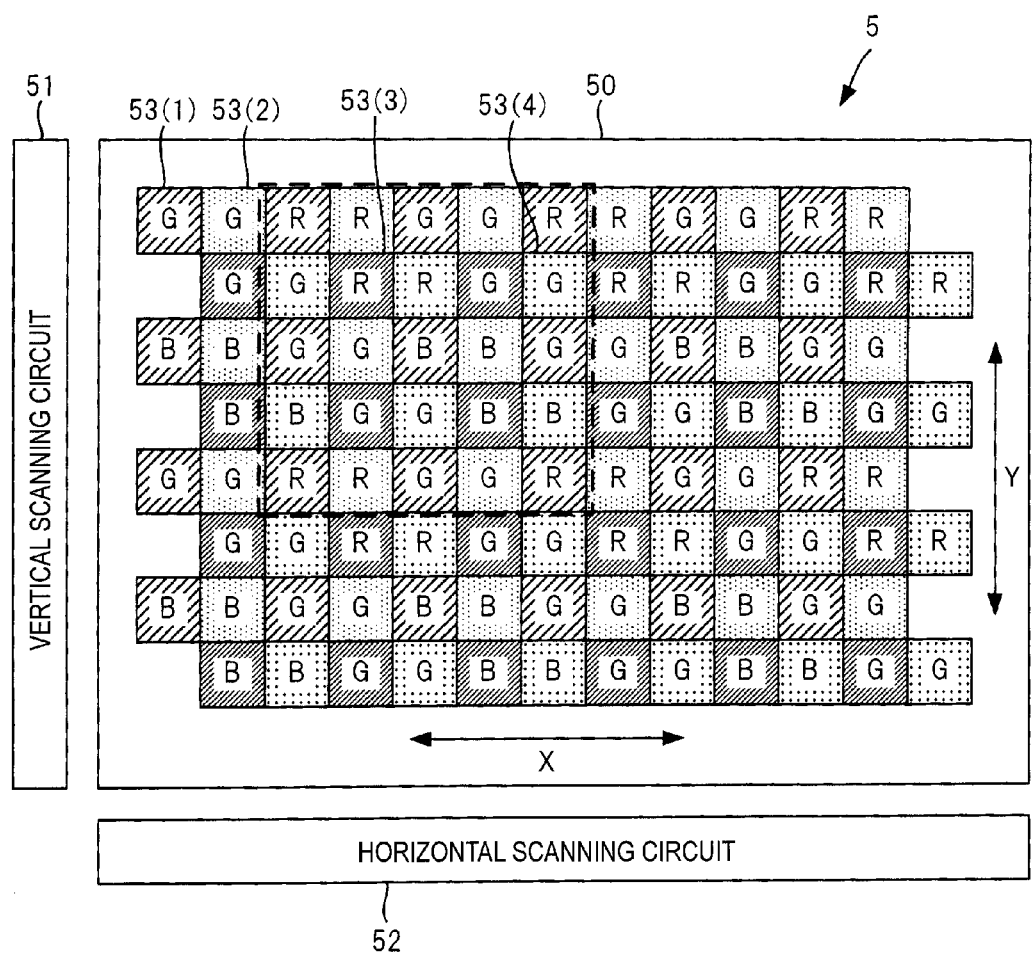
FIG. 2 is a schematic plan view showing a general configuration of a solid-state imaging device 5 shown in FIG. 1.

FIG. 2 is a schematic plan view showing a general configuration of the solid-state imaging device 5 shown in FIG. 1.

The solid-state imaging device 5 is equipped with a pixel cell area 50 in which plural pixel cells 53(1)-53(4) each including a photoelectric conversion element such as a photodiode are arranged two-dimensionally, that is, in the row direction X and the column direction Y which is perpendicular to the row direction X, a vertical scanning circuit 51, and a horizontal scanning circuit 52. In the following description, the pixel cells 53(1)-53(4) may be referred to as pixel cells 53 without being discriminated from each other.

In the pixel cell area 50, four or more pixel cell rows consisting of pixel cells 53 arranged in the row direction X at a constant pitch are arranged in the column direction Y at a constant pitch.

Among the four or more pixel cell rows, a set of odd-numbered rows and a set of even-numbered rows are shifted from each other in the row direction X by the arrangement pitch of the pixel cells 53 of each pixel cell row.

The large number of pixel cells 53 arranged in the pixel cell area 50 include three kinds of pixel cells 53, that is, pixel cells 53 (hereinafter referred to as R pixel cells 53) each including a photoelectric conversion element for detecting light in a red wavelength range, pixel cells 53 (hereinafter referred to as G pixel cells 53) each including a photoelectric conversion element for detecting light in a green wavelength range, and pixel cells 53 (hereinafter referred to as B pixel cells 53) each including a photoelectric conversion element for detecting light in a blue wavelength range.

The detection wavelength range of each photoelectric conversion element is controlled by, for example, a color filter which is disposed over the photoelectric conversion element.

In FIG. 2, character "R" is written in each block indicating an R pixel cell 53, character "G" is written in each block indicating a G pixel cell 53, and character "B" is written in each block indicating a B pixel cell 53.

Among the pixel cells 53 existing in the pixel cell area 50, pixel cells 53 located in an odd-numbered row and an odd-numbered column are referred to as pixel cells 53(1). The pixel cells 53(1) assume a Bayer arrangement as a whole.

A pixel cell 53(2) that is of the same kind as each pixel cell 53(1) is located adjacent (right-adjacent) to the pixel cell 53(1) in the row direction X. Thus, the pixel cells 53(2) also assume a Bayer arrangement as a whole.

A pixel cell 53(3) that is of the same kind as each pixel cell 53(2) is located adjacent (bottom-adjacent) to the pixel cell 53(2) in the column direction Y. Thus, the pixel cells 53(3) also assume a Bayer arrangement as a whole.

A pixel cell 53(4) that is of the same kind as each pixel cell 53(3) is located adjacent (right-adjacent) to the pixel cell 53(3) in the row direction X. Thus, the pixel cells 53(4) also assume a Bayer arrangement as a whole.

In this manner, in the pixel cell area 50 of the solid-state imaging device 5, units each consisting of four pixel cells 53 of the same kind whose centers are the apices of a parallelogram are arranged two-dimensionally, that is, in the row direction X and the column direction Y.

With the above arrangement, in a first pixel cell group consisting of pixel cells 53 belonging to odd-numbered rows or even-numbered rows, first pixel cell rows in each of which sets of two G pixel cells 53 and sets of two R pixel cells 53 are arranged alternately in the row direction X and second pixel cell rows in each of which sets of two G pixel cells 53 and sets of two B pixel cells 53 are arranged alternately in the row direction X are arranged alternately in the column direction Y.

Among the pixel cells 53 belonging to the second pixel cell rows, the G pixel cells 53 are located at the positions corresponding to (i.e., the same positions in the row direction X as) the positions of the respective R pixel cells 53 belonging to the first pixel cell rows and the B pixel cells 53 are located at the positions corresponding to the positions of the respective G pixel cells 53 belonging to the first pixel cell rows.

In each of a pair of first pixel cell rows that are adjacent to each other in the column direction Y and a pair of second pixel cell rows that are adjacent to each other in the column direction Y, a pixel cell 53 of the same kind as each pixel cell 53 belonging to the first pixel cell group is located at the position that is deviated in the row direction X by the pixel cell arrangement pitch and deviated in the column direction Y by one pixel cell row pitch from the pixel cell 53 belonging to the first pixel cell group. A pixel cell 53 belonging to the first pixel cell group and such a pixel cell 53 belonging to a second pixel cell group that is located on the bottom right of the former constitute a pixel cell pair.

The vertical scanning circuit 51 controls all the pixel cell rows of the pixel cell area 50 independently.

The horizontal scanning circuit 52 controls the output, to the outside of the solid-state imaging device 5, of imaging signals that are output from the respective pixel cell columns of the pixel cell area 50.

Figure 3:
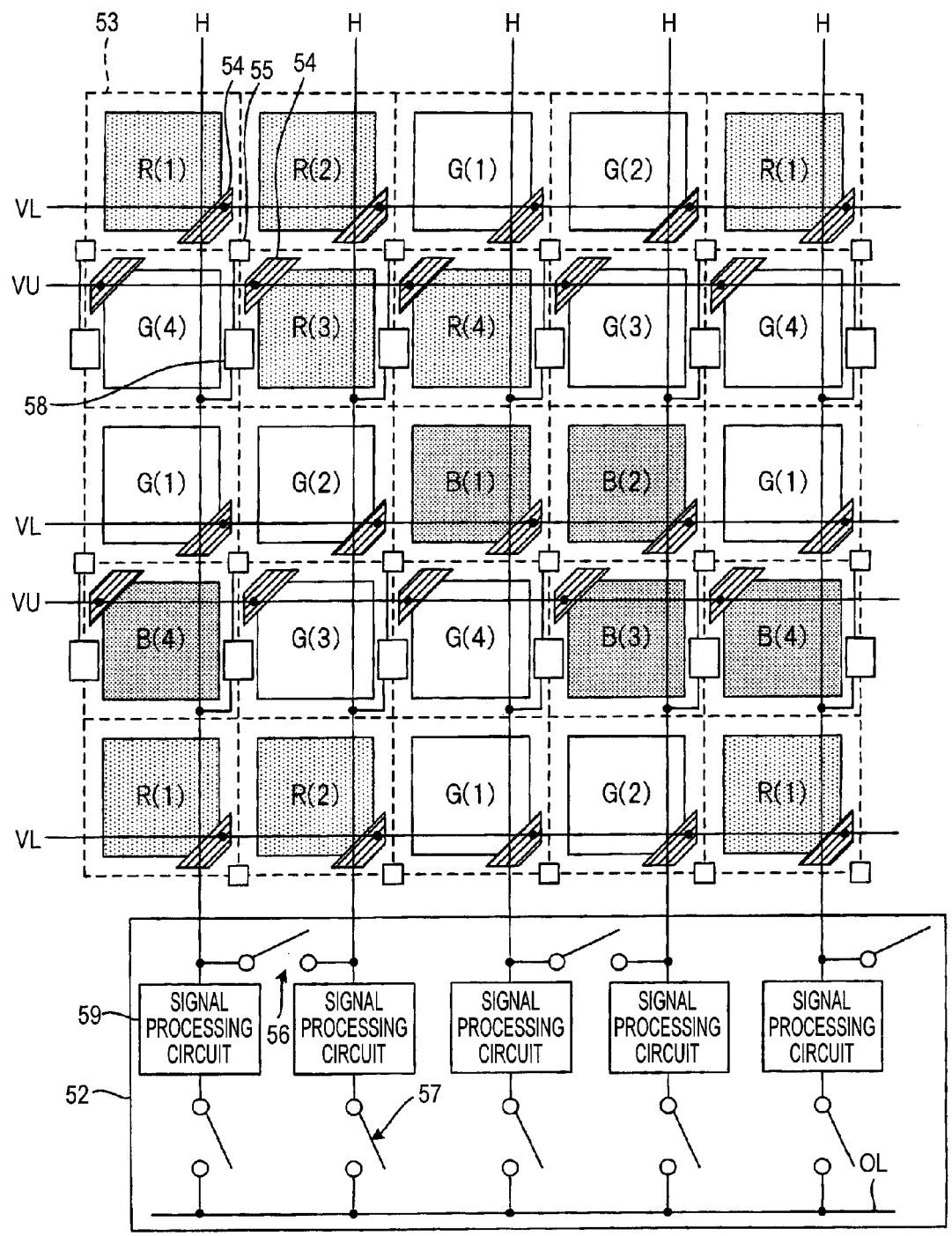
FIG. 3 is an enlarged view of part, indicated by a broken line, of a pixel cell area 50 of the solid-state imaging device 5 shown in FIG. 2.

FIG. 3 is an enlarged view of part, indicated by a broken line, of the pixel cell area 50 of the solid-state imaging device 5 shown in FIG. 2.

Each pixel cell 53 includes a photoelectric conversion element formed in a semiconductor substrate.

In FIG. 3, the photoelectric conversion elements included in pixel cells 53(1)-53(4) for detecting red light are denoted by respective symbols R(1)-R(4). The photoelectric conversion elements included in pixel cells 53(1)-53(4) for detecting blue light are denoted by respective symbols B(1)-B(4). The photoelectric conversion elements included in pixel cells 53(1)-53(4) for detecting green light are denoted by respective symbols G(1)-G(4).

In the following description, pixel cells 53 including photoelectric conversion elements R(1)-R(4) will be referred to as pixel cells 53R(1)-53R(4), respectively. Pixel cells 53 including photoelectric conversion elements G(1)-G(4) will be referred to as pixel cells 53G(1)-53G(4), respectively. Pixel cells 53 including photoelectric conversion elements B(1)-B(4) will be referred to as pixel cells 53B(1)-53B(4), respectively.

Each pair of pixel cells 53 of the same kind that are adjacent to each other in the diagonal direction are provided with a floating diffusion layer 55 formed in the semiconductor substrate and a signal output circuit 58 connected to the floating diffusion layer 55.

The floating diffusion layer 55 is a charge storage layer for storing charge generated in the photoelectric conversion elements of the corresponding pixel cells 53.

A transfer electrode 54 is formed above the semiconductor substrate at a position located between the photoelectric conversion element of each pixel cell 53 and the floating diffusion layer 55 corresponding to the pixel cell 53.

The transfer electrode 54 serves to transfer charge generated in the photoelectric conversion element of the associated pixel cell 53 to the floating diffusion layer 55 corresponding to the pixel cell 53.

Each pixel cell column consisting of pixel cells 53 arranged in the column direction Y is provided with a signal line H.

A signal line H corresponding to each pixel cell column including pixel cells 53R(1) and pixel cells 53G(1) is connected to signal output circuits 58 that correspond to the pixel cells 53R(1) and 53G(1), respectively.

A signal line H corresponding to each pixel cell column including pixel cells 53R(2) and pixel cells 53G(2) is connected to signal output circuits 58 that correspond to the pixel cells 53R(2) and 53G(2), respectively.

A signal line H corresponding to each pixel cell column including pixel cells 53G(1) and pixel cells 53B(1) is connected to signal output circuits 58 that correspond to the pixel cells 53G(1) and 53B(1), respectively.

A signal line H corresponding to each pixel cell column including pixel cells 53G(2) and pixel cells 53B(2) is connected to signal output circuits 58 that correspond to the pixel cells 53G(2) and 53B(2), respectively.

Each signal line H is connected to the horizontal scanning circuit 52.

The horizontal scanning circuit 52 is equipped with signal processing circuits 59 which are connected to respective signal lines H, switches 57 one ends of which are connected to the respective signal processing circuits 59 and the other ends of which are connected to a signal output line OL, and summation averaging switches 56.

Each signal processing circuit 59 performs correlated double sampling processing, AD conversion processing, etc. on an imaging signal that is output from the associated signal line H.

By turning on a switch 57, the horizontal scanning circuit 52 causes an imaging signal as a processing result of the signal processing circuit 59 connected to the switch 57 to be output to outside the solid-state imaging device 5 through the signal output line OL.

Each summation averaging switch 56 is connected between two signal lines H to which the two respective signal output circuits 58 corresponding to a unit are connected.

The horizontal scanning circuit 52 controls the turning on/off of the summation averaging switches 56. When a summation averaging switch 56 is turned on, potentials of the two signal lines H are summation-averaged. If in this state a switch 57 connected to one of the two signal lines H, an imaging signal as a summation averaging result is output to the signal output line OL through the switch 57 thus turned on.

As such, each summation averaging switch 56 serves to obtain a summation averaging result of two imaging signals that are output to the two signal lines H to which the two respective signal output circuits 58 corresponding to a unit are connected.

Each odd-numbered pixel cell row is provided with a control signal line VL which extends in the row direction X. Each even-numbered pixel cell row is provided with a control signal line VU which extends in the row direction X.

Each control signal line VL is connected to the transfer electrodes included in the pixel cells 53 of the corresponding pixel cell row. Each control signal line VU is connected to the transfer electrodes included in the pixel cells 53 of the corresponding pixel cell row.

The control signal lines VL and the control signal lines VU are connected to the vertical scanning circuit 51. The vertical scanning circuit 51 supplies control signals independently to the control signal lines VL and VU connected to it.

The control signal is a high-level signal for causing a transfer electrode 54 to perform charge transfer from the associated photoelectric conversion element to the associated floating diffusion layer 55 or a low-level signal for causing a transfer electrode 54 to form a barrier between the associated photoelectric conversion element and the associated floating diffusion layer 55.

The vertical scanning circuit 51 and the horizontal scanning circuit 52 operate according to instructions supplied from the imaging device drive unit 10 shown in FIG. 1.

The imaging device drive unit 10 drives the solid-state imaging device 5 in various manners. Driving methods of the solid-state imaging device 5 will be described below individually.

[All Pixels Reading Driving]

All pixels reading driving is driving for individually reading out and outputting, to outside the solid-state imaging device 5, signals detected by all the pixel cells 53 included in the solid-state imaging device 5.

Figure 4:
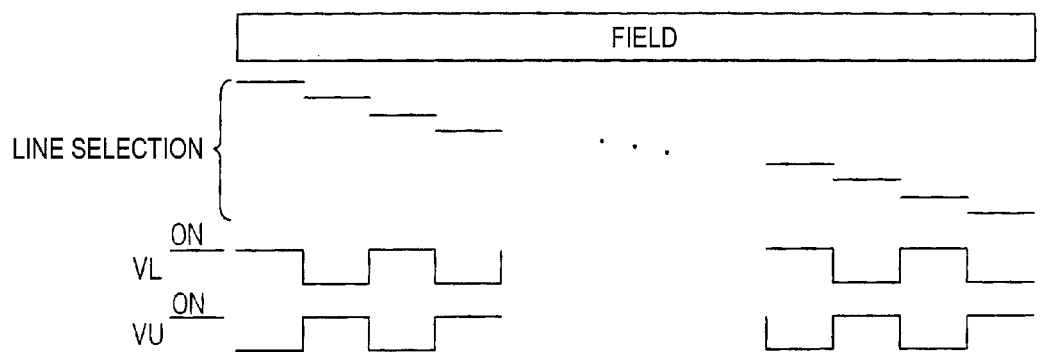
FIG. 4 is a timing chart of all pixels reading driving.

FIG. 4 is a timing chart of the all pixels reading driving.

The vertical scanning circuit 51 selects the pixel cell rows sequentially from the first row and supplies a high-level signal to the control signal line corresponding to each selected pixel cell row.

As a result, imaging signals corresponding to charges stored in the photoelectric conversion elements of the pixel cells 53 of the selected pixel cell row are output to the signal lines H from the signal output circuits 58 corresponding to the respective pixel cells 53.

When the imaging signals are output from the pixel cells 53 of the pixel cell row selected by the vertical scanning circuit 51 to the respective signal lines H, the imaging signals are processed and held by the respective signal processing circuits 59. The horizontal scanning circuit 52 turns on the switches 57 sequentially from the left (i.e., performs horizontal scanning).

As a result, the imaging signals held by the signal processing circuits 59 are sequentially output to the outside via the turned-on switches 57 and the signal output line OL. Thus, the imaging signals of the one pixel cell row are output to outside the solid-state imaging device 5.

When the imaging signals of the one pixel cell row have been output to outside the solid-state imaging device 5, the vertical scanning circuit 51 resets the floating diffusion layers 55 corresponding to the selected pixel cell row and moves on to selection of the next pixel cell row.

The imaging device drive unit 10 causes the vertical scanning circuit 51 and the horizontal scanning circuit 52 to perform the above-described driving and thereby reads out and outputs, to outside the solid-state imaging device 5, imaging signals detected by all the pixel cells 53 included in the solid-state imaging device 5.

With the all pixels reading driving, imaging signals can be acquired in the same number as the total number of the pixel cells 53 included in the solid-state imaging device 5, whereby high-resolution shot image data can be generated.

[2-Fields Reading Driving]

Two-fields reading driving is driving for individually reading out and outputting, to outside the solid-state imaging device 5, imaging signals in such a manner that among imaging signals detected by all the pixel cells 53 included in the solid-state imaging device 5 ones detected by the pixel cells 53 of the odd-numbered rows and ones detected by the pixel cells 53 of the even-numbered rows are read out separately, that is, in different fields.

Figure 5:
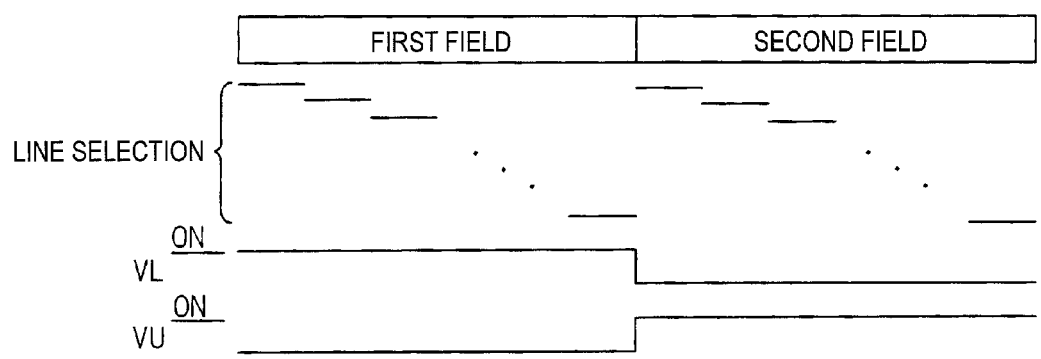
FIG. 5 is a timing chart of 2-fields reading driving.

FIG. 5 is a timing chart of the 2-fields reading driving.

In a first field, the vertical scanning circuit 51 selects the odd-numbered pixel cell rows sequentially from the top and supplies a high-level signal to the control signal line VL corresponding to each selected pixel cell row.

As a result, imaging signals corresponding to charges stored in the photoelectric conversion elements of the pixel cells 53 of the selected pixel cell row are output to the signal lines H from the signal output circuits 58 corresponding to the respective pixel cells 53. The imaging signals that have been output to the respective signal lines H are output sequentially to outside the solid-state imaging device 5 via the signal output line OL by horizontal scanning.

When the imaging signals of the one pixel cell row have been output to outside the solid-state imaging device 5, the vertical scanning circuit 51 resets the floating diffusion layers 55 corresponding to the selected pixel cell row and moves on to selection of the next one of the odd-numbered pixel cell rows.

The first-field operation is finished when the lowest one of the odd-numbered pixel cell rows has been selected by the vertical scanning circuit 51 and imaging signals of that pixel cell row have been output to outside the solid-state imaging device 5.

In a subsequent second field, the vertical scanning circuit 51 selects the even-numbered pixel cell rows sequentially from the top and supplies a high-level signal to the control signal line VU corresponding to each selected pixel cell row.

As a result, imaging signals corresponding to charges stored in the photoelectric conversion elements of the pixel cells 53 of the selected pixel cell row are output to the signal lines H from the signal output circuits 58 corresponding to the respective pixel cells 53. The imaging signals that have been output to the respective signal lines H are output sequentially to outside the solid-state imaging device 5 via the signal output line OL by horizontal scanning.

When the imaging signals of the one pixel cell row have been output to outside the solid-state imaging device 5, the vertical scanning circuit 51 resets the floating diffusion layers 55 corresponding to the selected pixel cell row and moves on to selection of the next pixel cell row.

The second-field operation is finished when the lowest one of the even numbered pixel cell rows has been selected by the vertical scanning circuit 51 and imaging signals of that pixel cell row have been output to outside the solid-state imaging device 5.

The imaging device drive unit 10 causes the vertical scanning circuit 51 and the horizontal scanning circuit 52 to perform the above-described driving and thereby reads out shot image signals separately from the pixel cells 53 of the odd-numbered rows of the solid-state imaging device 5 and the pixel cells 53 of its even-numbered rows.

In the 2-fields reading driving, in the second field imaging signals are read from the pixel cells 53 of the even-numbered rows. Therefore, the pixel cells 53 of the even-numbered rows can be kept exposed to light in the first field. That is, the imaging device drive unit 10 can perform driving in which the exposure time is changed between the odd-numbered rows and the even-numbered rows.

This makes it possible to obtain a dynamic-range-expanded shot image signal by combining a shot image signal acquired from the pixel cells 53 of the odd-numbered rows with a shot image signal acquired from the pixel cells 53 of the even-numbered rows. Therefore, even with a subject having a large brightness difference, it becomes possible to generate shot image data that reflects the brightness difference faithfully.

[2-Diagonal-Pixels Summation Reading Driving]

Two-diagonal-pixels summation reading driving is driving for adding together, by the floating diffusion layer 55, charges generated in the photoelectric conversion elements included in two pixel cells 53 sharing a floating diffusion layer 55 and outputting an imaging signal corresponding to an addition result charge to outside the solid-state imaging device 5.

Figure 6:
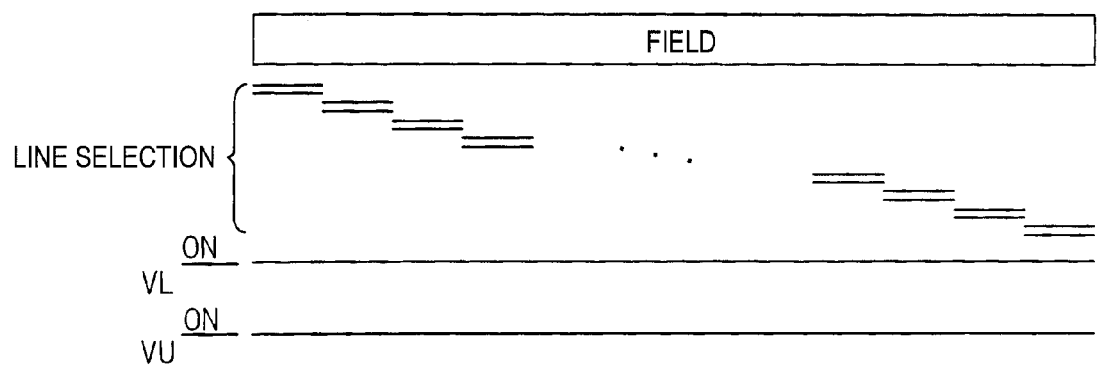
FIG. 6 is a timing chart of 2-diagonal-pixels summation reading driving.

FIG. 6 is a timing chart of the 2-diagonal-pixels summation reading driving.

The vertical scanning circuit 51 selects the pixel cell rows sequentially from the top two each time, and supplies high-level signals to the control signal lines VL and VU corresponding to each selected pair of pixel cell rows.

As a result, charges stored in the photoelectric conversion elements of the pixel cells 53 of the selected two pixel cell rows are transferred simultaneously to the associated floating diffusion layers 55 and added together there. Imaging signals corresponding to addition result charges are output from the associated signal output circuits 58 to the signal lines H, respectively.

The imaging signals that have been output to the respective signal lines H are output sequentially to outside the solid-state imaging device 5 via the signal output line OL by horizontal scanning.

When the imaging signals of the two pixel cell rows have been output to outside the solid-state imaging device 5, the vertical scanning circuit 51 resets the floating diffusion layers 55 corresponding to the selected pixel cell rows and moves on to selection of the next two pixel cell rows.

Figure 7:
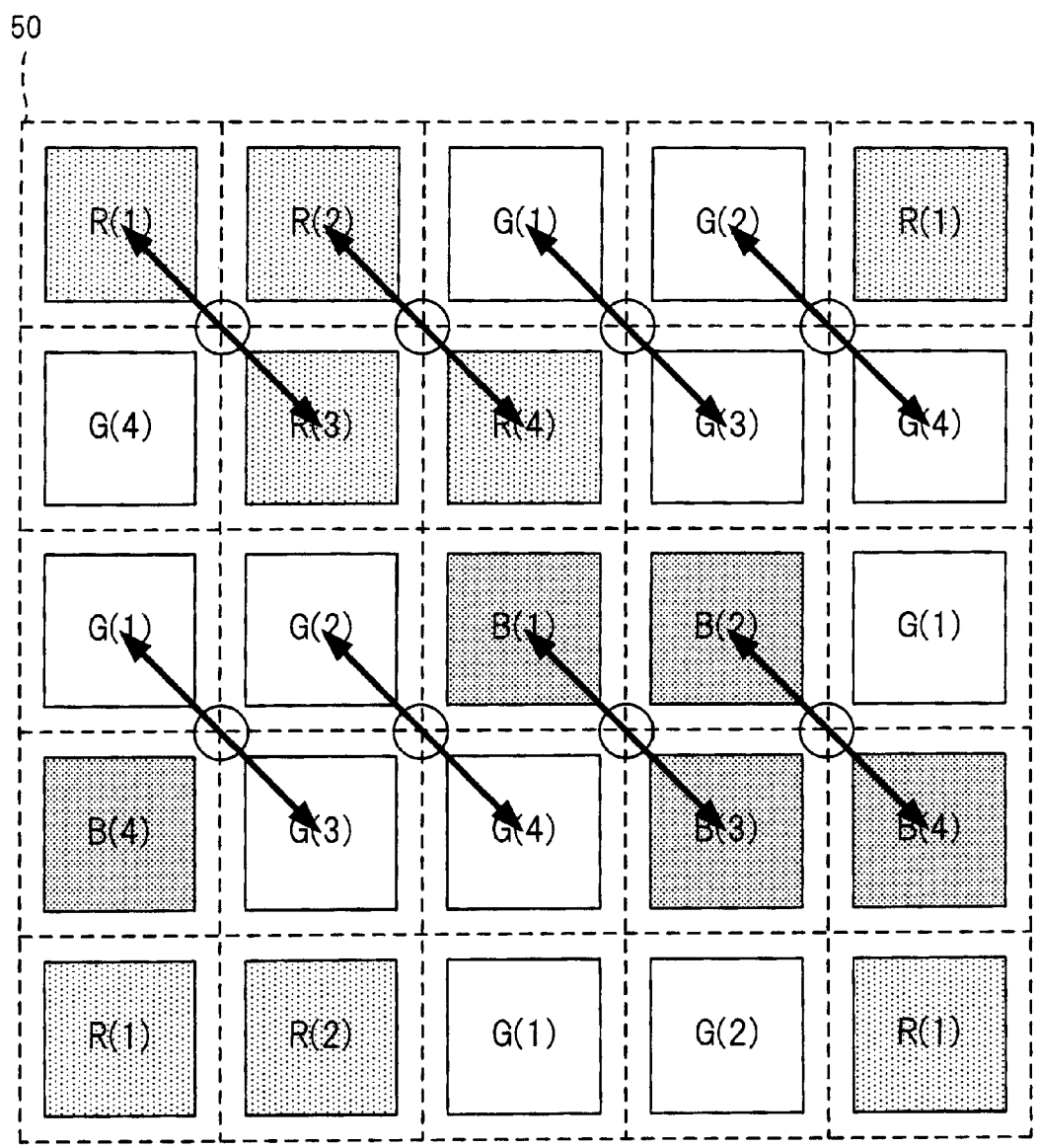
FIG. 7 illustrates how the 2-diagonal-pixels summation reading driving is done.

With the 2-diagonal-pixels summation reading driving, charges of each pixel cells 53 that are connected to each other by an arrow in FIG. 7 can be added together and an imaging signal corresponding to an addition result charge can be output. With this type of driving, since charges are added together by each floating diffusion layer 55, a high-sensitivity, large SN ratio shot image signal can be obtained.

Furthermore, with this type of driving, since charges of pixel cells 53 of the same kind that are adjacent to each other in the diagonal direction are added together, a higher resolving power can be obtained than in a case that charges of pixel cells of the same kind that are adjacent to each other in the vertical direction are added together or a case charges of pixel cells of the same kind that are adjacent to each other in the horizontal direction are added together.

[2-Horizontal-Pixels Summation Averaging Reading Driving]

Two-horizontal-pixels summation averaging reading driving is driving for summation-averaging, in the solid-state imaging device 5, imaging signals read from two pixel cells 53 of the same kind that are adjacent to each other in the row direction X and outputting an imaging signal as a summation averaging result to outside the solid-state imaging device 5.

Figure 8:
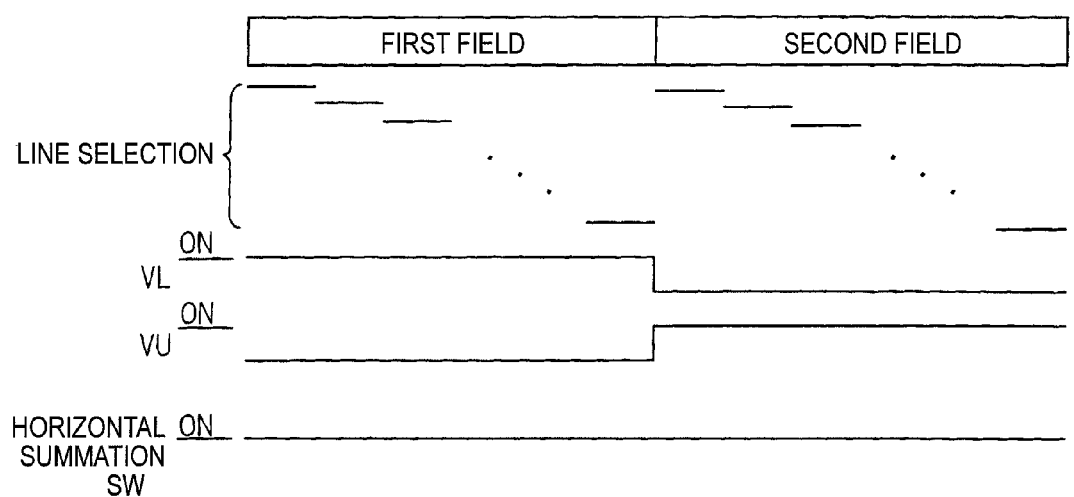
FIG. 8 is a timing chart of 2-horizontal-pixels summation averaging reading driving.

FIG. 8 is a timing chart of the 2-horizontal-pixels summation averaging reading driving.

In a first field, the vertical scanning circuit 51 selects the odd-numbered pixel cell rows sequentially from the top. And the vertical scanning circuit 51 supplies a high-level signal to the control signal line VL corresponding to each selected pixel cell row and thereby causes charge transfer from the photoelectric conversion elements of the pixel cells 53 of the selected pixel cell row to the respective floating diffusion layers 55. Imaging signals corresponding to the charges transferred to the floating diffusion layers 55 are output to the signal lines H via the signal output circuits 58, respectively.

When the imaging signals have been output to the respective signal lines H, the horizontal scanning circuit 52 turns on the summation averaging switches 56. As a result, a summation-averaged signal of imaging signals read from each pair of pixel cells 53 of the same kind that are adjacent to each other in the row direction in the selected pixel cell row is input to the two signal processing circuits 59 connected to the associated summation averaging switch 56. The horizontal scanning circuit 52 turns on every other switch 57 in order from the left.

As a result, the imaging signals (summation-averaged imaging signals) held by the signal processing circuits 59 are output sequentially to the outside via the turned-on switches 57 and the signal output line OL. The imaging signals of the one pixel cell row are output to outside the solid-state imaging device 5.

When the imaging signals of the one pixel cell row have been output to outside the solid-state imaging device 5, the vertical scanning circuit 51 resets the floating diffusion layers 55 corresponding to the selected pixel cell row and moves on to selection of the next pixel cell row.

The first-field operation is finished when the lowest one of the odd-numbered pixel cell rows has been selected by the vertical scanning circuit 51 and imaging signals of that pixel cell row have been output to outside the solid-state imaging device 5.

In a subsequent second field, the vertical scanning circuit 51 selects the even-numbered pixel cell rows sequentially from the top. And the vertical scanning circuit 51 supplies a high-level signal to the control signal line VU corresponding to each selected pixel cell row and thereby causes charge transfer from the photoelectric conversion elements of the pixel cells 53 of the selected pixel cell row to the respective floating diffusion layers 55. Imaging signals corresponding to the charges transferred to the floating diffusion layers 55 are output to the signal lines H via the signal output circuits 58, respectively.

When the imaging signals have been output to the respective signal lines H, the horizontal scanning circuit 52 turns on the summation averaging switches 56. As a result, a summation-averaged signal of imaging signals read from each pair of pixel cells 53 of the same kind that are adjacent to each other in the row direction in the selected pixel cell row is input to the two signal processing circuits 59 connected to the associated summation averaging switch 56. The horizontal scanning circuit 52 turns on every other switch 57 in order from the left.

As a result, the imaging signals (summation-averaged imaging signals) held by the signal processing circuits 59 are output sequentially to the outside via the turned-on switches 57 and the signal output line OL. The imaging signals of the one pixel cell row are output to outside the solid-state imaging device 5.

When the imaging signals of the one pixel cell row have been output to outside the solid-state imaging device 5, the vertical scanning circuit 51 resets the floating diffusion layers 55 corresponding to the selected pixel cell row and moves on to selection of the next pixel cell row.

The second-field operation is finished when the lowest one of the even-numbered pixel cell rows has been selected by the vertical scanning circuit 51 and imaging signals of that pixel cell row have been output to outside the solid-state imaging device 5.

Although in the above description shot image signals are read out separately from the odd-numbered rows and the even-numbered rows in two fields, a shot image signal may be read out from all the pixel cells 53 in one field.

That is, the vertical scanning circuit 51 selects all the pixel cell rows sequentially from the top. And the vertical scanning circuit 51 supplies a high-level signal to the control signal line VL corresponding to each selected pixel cell row and thereby causes output of imaging signals to the respective signal lines H. Then summation averaging is performed by the summation averaging switches 56. In this manner, imaging signals are obtained from each pixel cell row in a number that is equal to half of the number of pixel cells 53 included in the pixel cell row TOW.

Figure 9:
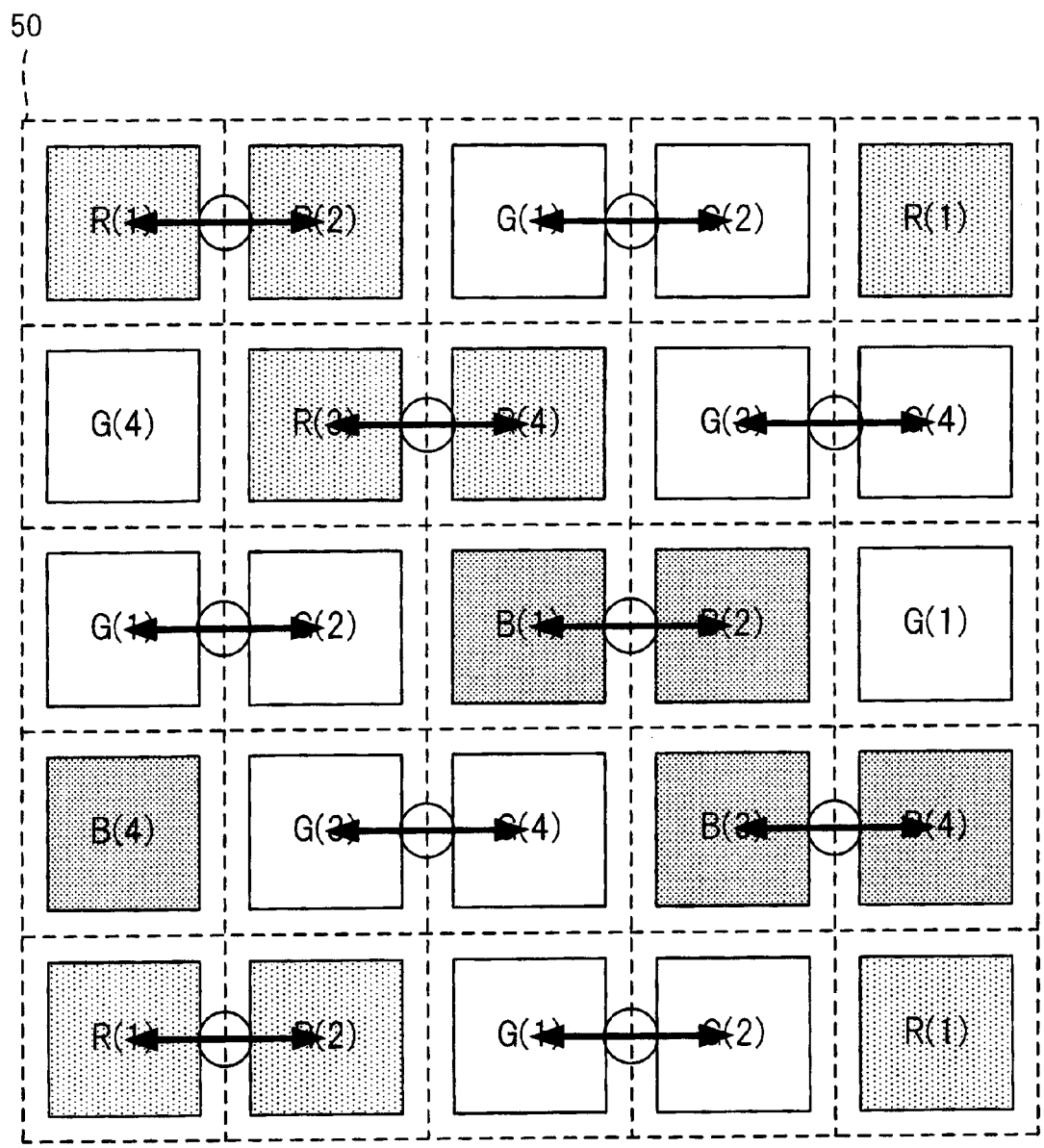
FIG. 9 illustrates how the 2-horizontal-pixels summation averaging reading driving is done.

With the 2-horizontal-pixels summation averaging reading driving, imaging signals obtained from each pair of pixel cells 53 that are connected to each other by an arrow in FIG. 9 can be summation-averaged and an imaging signal as a summation averaging result can be output. With this type of driving, since imaging signals are summation-averaged, a large S/N ratio shot image signal can be obtained.

Furthermore, with this type of driving, summation averaged imaging signals are arranged at spatial positions indicated by mark "o" in FIG. 9 which is what is called a honeycomb arrangement. Therefore, high-resolution shot image data can be generated.

[4-Pixels Summation Averaging Reading Driving]

Four-pixels summation averaging reading driving is driving for adding together charges generated by each pair of pixel cells 53 that are adjacent to each other in the diagonal direction among the four pixel cells 53 constituting each unit, summation-averaging imaging signals corresponding to addition result charges, and outputting an imaging signal as an addition result to outside the solid-state imaging device 5.

Figure 10:
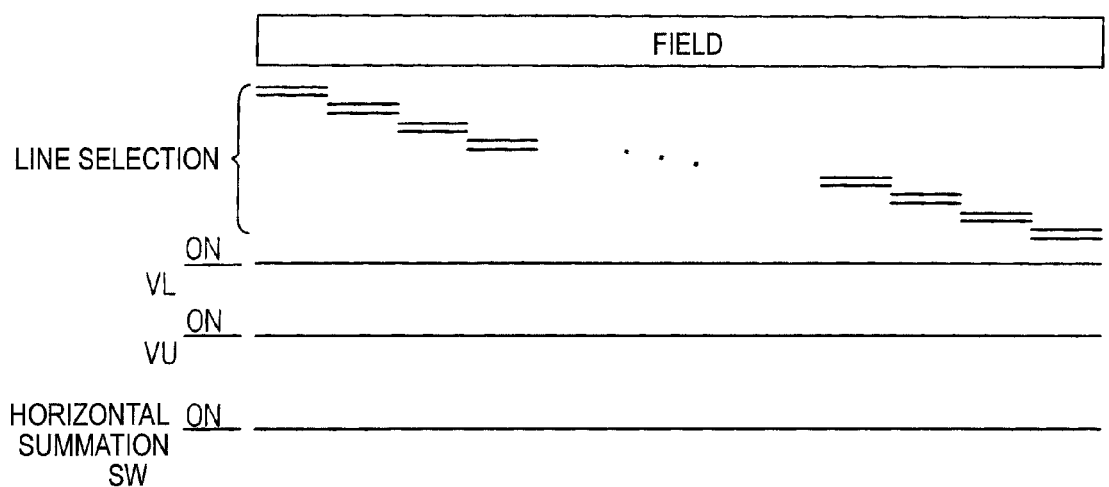
FIG. 10 is a timing chart of 4-pixels summation averaging reading driving.

FIG. 10 is a timing chart of the 4-pixels summation averaging reading driving.

The vertical scanning circuit 51 selects the pixel cell rows sequentially from the top two each time, and supplies high-level signals to the control signal lines VL and VU corresponding to each selected pair of pixel cell rows.

As a result, charges stored in the photoelectric conversion elements of the pixel cells 53 of the selected two pixel cell rows are transferred simultaneously to the associated floating diffusion layers 55 and added together there. Imaging signals corresponding to addition result charges are output from the associated signal output circuits 58 to the signal lines H, respectively.

When the imaging signals have been output to the respective signal lines H, the horizontal scanning circuit 52 turns on the summation averaging switches 56. As a result, a summation-averaged signal of imaging signals (each obtained by two diagonal pixels summation) that have been output to the signal lines H connected to each summation averaging switch 56 is input to the two signal processing circuits 59 connected to the associated summation averaging switch 56.

The horizontal scanning circuit 52 turns on every other switch 57 in order from the left. As a result, the imaging signals (summation-averaged imaging signals) held by the signal processing circuits 59 are output sequentially to the outside via the turned-on switches 57 and the signal output line OL. The imaging signals of the two pixel cell rows are output to outside the solid-state imaging device 5.

When the imaging signals of the two pixel cell rows have been output to outside the solid-state imaging device 5, the vertical scanning circuit 51 resets the floating diffusion layers 55 corresponding to the selected two pixel cell rows and moves on to selection of the next two pixel cell rows. The above operation is performed repeatedly.

With the 4-pixels summation averaging reading driving, a shot image signal that is output from the solid-state imaging device 5 assumes a Bayer arrangement with no expansion or compression in aspect ratio and no pixel cell of another color exists between the addition pixel cells. This makes it possible to produce an image having very few jaggy portions and false colors.

Figure 11:
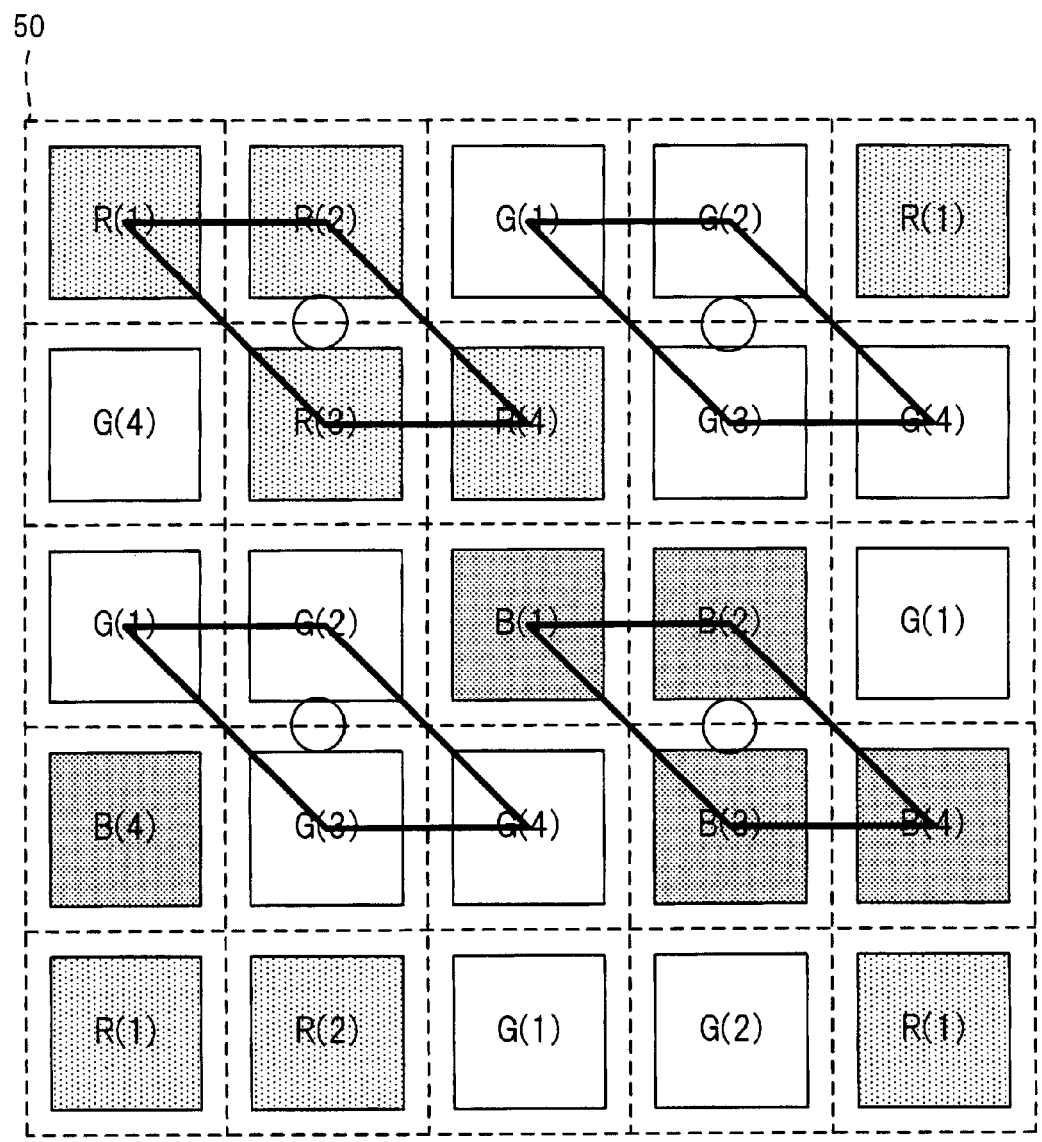
FIG. 11 illustrates how the 4-pixels summation averaging reading driving is done.

The 4-pixels summation averaging reading driving can produce imaging signals each obtained by adding together imaging signals generated by four pixel cells 53 that are connected to each other by thick solid lines in FIG. 11 and dividing an addition result by 2. This driving can produce a large S/N ratio shot image signal because addition of charges and summation averaging of imaging signals are performed.

Furthermore, with the 4-pixels summation averaging reading driving, imaging signals each corresponding to four pixel cells 53 can be obtained by combining selection of pixel cell rows (two each time) and turning-on of the summation averaging switches 56. This makes it possible to read out a low-resolution shot image signal at high speed.

Next, a description will be made of how the digital camera shown in FIG. 1 operates.

Figure 12:
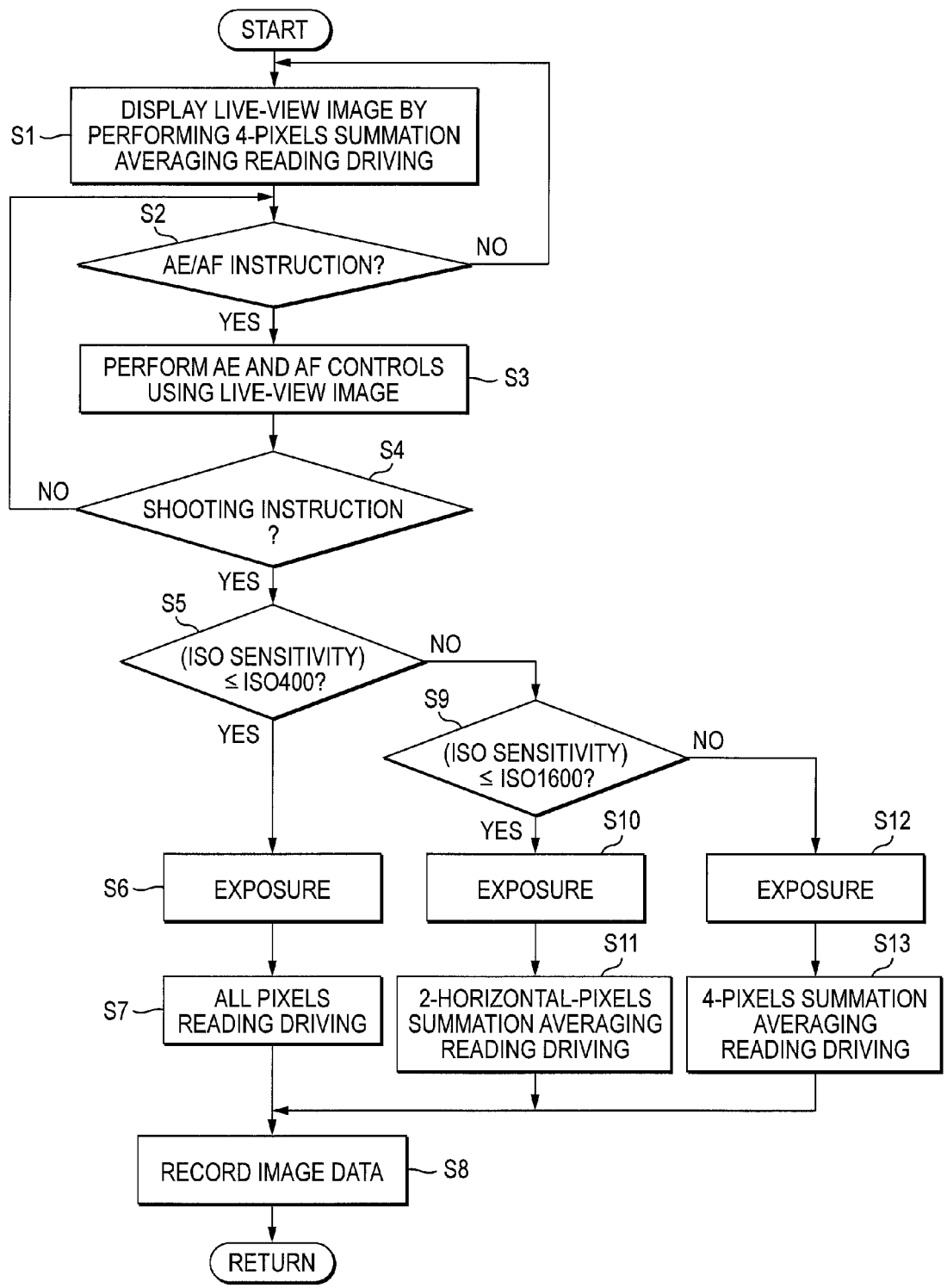
FIG. 12 is a flowchart for description of how the digital camera shown in FIG. 1 operates in taking a still image.

FIG. 12 is a flowchart for description of how the digital camera shown in FIG. 1 operates in taking a still image.

When a still image shooting mode is set as a result of manipulation of the manipulation unit 14, the imaging device drive unit 10 starts moving image shooting for display of a live-view image by the solid-state imaging device 5. The live-view image is an image for a real-time check, on the display unit 23, of a subject image being taken by the solid-state imaging device 5.

While a moving image is being taken to acquire a live-view image, the imaging device drive unit 10 causes the solid-state imaging device 5 to output shot image signals sequentially by performing 4-pixels summation averaging reading driving every four frame (step S1).

The shot image signal that is output from the solid-state imaging device 5 is processed by the digital signal processing unit 17 and a live-view image is displayed on the display unit 23 on the basis of shot image data as a processing result.

If AE (auto-exposure)/AF (autofocus) instruction is made by, for example, half depression of a release button that is included in the manipulation unit 14 after the start of the moving image shooting for a live-view image (step S2: yes), the system control unit 11 performs an AE control and an AF control using a shot image signal that is output from the solid-state imaging device 5 at the time of reception of the instruction (step S3). For example, the AF control is performed in the form of contrast AF.

If the release button is depressed fully after step S3 (step S4: yes), the system control unit 11 judges a shooting ISO sensitivity that is set in the digital camera.

If the shooting ISO sensitivity is lower than or equal to ISO400 (step S5: yes), the system control unit 11 instructs the imaging device drive unit 10 to start exposure and perform all pixels reading driving for still image shooting.

In response to this instruction, the imaging device drive unit 10 starts exposure of the solid-state imaging device 5 (step S6). After completion of the exposure, the imaging device drive unit 10 performs all pixels reading driving (step S7). As a result of this driving, a shot image signal consisting of imaging signals corresponding to all the pixel cells 53 is output from the solid-state imaging device 5.

When the shot image signal has been output, the digital signal processing unit 17 processes it to generate shot image data. The generated shot image data is compressed and recorded in the recording medium 21 (step S8). Thus, the still image shooting in response to the shooting instruction which was made at step S4 is finished.

The pieces of processing performed by the digital signal processing unit 17 include amplification processing of amplifying each of imaging signals constituting a shot image signal at a gain corresponding to the shooting ISO sensitivity. When the shooting ISO sensitivity is lower than or equal to ISO400, the gain of the amplification processing is low and hence the influence of noise contained in an imaging signal is small even if it is amplified.

If the shooting ISO sensitivity is higher than ISO400 and lower than or equal to ISO1600 (step S9: yes), the system control unit 11 instructs the imaging device drive unit 10 to start exposure and perform 2-horizontal-pixels summation averaging reading driving for still image shooting.

In response to this instruction, the imaging device drive unit 10 starts exposure of the solid-state imaging device 5 (step S10). After completion of the exposure, the imaging device drive unit 10 performs 2-horizontal-pixels summation averaging reading driving (step S11).

As a result of this driving, a shot image signal consisting of imaging signals corresponding to half of all the pixel cells 53 is output from the solid-state imaging device 5. This shot image signal is reduced in noise because each imaging signal is obtained by summation-averaging imaging signals detected by two pixel cells 53.

When the shot image signal is output by the driving of step S11, the digital signal processing unit 17 processes it to generate shot image data.

Since as described above each of imaging signals of the shot image signal obtained by the driving of step S11 is reduced in noise, noise as amplified by the amplification processing of the digital signal processing unit 17 is small. Thus, high-sensitivity, low-noise shot image data is generated by the digital signal processing unit 17. The generated shot image data is compressed and recorded in the recording medium 21 (step S8).

If the shooting ISO sensitivity is higher than ISO1600 (step S9: no), the system control unit 11 instructs the imaging device drive unit 10 to start exposure and perform 4-pixels summation averaging reading driving for still image shooting.

In response to this instruction, the imaging device drive unit 10 starts exposure of the solid-state imaging device 5 (step S12). After completion of the exposure, the imaging device drive unit 10 performs 4-pixels summation averaging reading driving (step S13).

As a result of this driving, a shot image signal consisting of imaging signals corresponding to the respective units of all the pixel cells 53 is output from the solid-state imaging device 5. This shot image signal is reduced in noise because each imaging signal is obtained by summation-averaging imaging signals detected by four pixel cells 53.

When the shot image signal is output by the driving of step S13, the digital signal processing unit 17 processes it to generate shot image data.

Since as described above each of imaging signals of the shot image signal obtained by the driving of step S12 is reduced in noise, noise as amplified by the amplification processing of the digital signal processing unit 17 is small. Thus, high-sensitivity, low-noise shot image data is generated by the digital signal processing unit 17. The generated shot image data is compressed and recorded in the recording medium 21 (step S8).

As described above, the imaging device drive unit 10 performs the all pixels reading driving, 2-horizontal-pixels summation averaging reading driving, and 4-pixels summation averaging reading driving in this order as the shooting ISO sensitivity increases. As a result, low-noise, high-image-quality still image data can be obtained irrespective of the shooting ISO sensitivity.

Although in the above description the driving method is switched in accordance with the shooting ISO sensitivity, the driving method may be switched in accordance with the brightness of a subject.

For example, the driving method may be switched in such a manner that the all pixels reading driving is performed if the brightness of a subject is lower than a first threshold value, the 2-horizontal-pixels summation averaging reading driving is performed if the brightness of a subject is higher than or equal to the first threshold value and lower than a second threshold value, and the 4-pixels summation averaging reading driving is performed if the brightness of a subject is higher than or equal to the second threshold value.

At step S11 in FIG. 12, the 2-diagonal-pixels summation reading driving may be performed instead of the 2-horizontal-pixels summation averaging reading driving.

In this case, each imaging signal that is output from the solid-state imaging device 5 corresponds to an addition result of imaging signals of two pixel cells 53 and hence the sensitivity becomes two times as high as in the case of the 2-horizontal-pixels summation averaging reading driving. Therefore, in the amplification processing performed by the digital signal processing unit 17, the gain may be set at half of a value to be used in the 2-horizontal-pixels summation averaging reading driving.

Thus, where the 2-diagonal-pixels summation reading driving is employed instead of the 2-horizontal-pixels summation averaging reading driving, the gain of the amplification processing can be lowered and hence still image data with lower noise can be generated.

The operation that is performed to take a still image has been described above. During moving image shooting, a high-frame-rate, large S/N moving image can be obtained by the system control unit 11's causing the imaging device drive unit 10 to perform the 4-pixels summation averaging reading driving or the 2-horizontal-pixels summation averaging reading driving.

Figure 13:
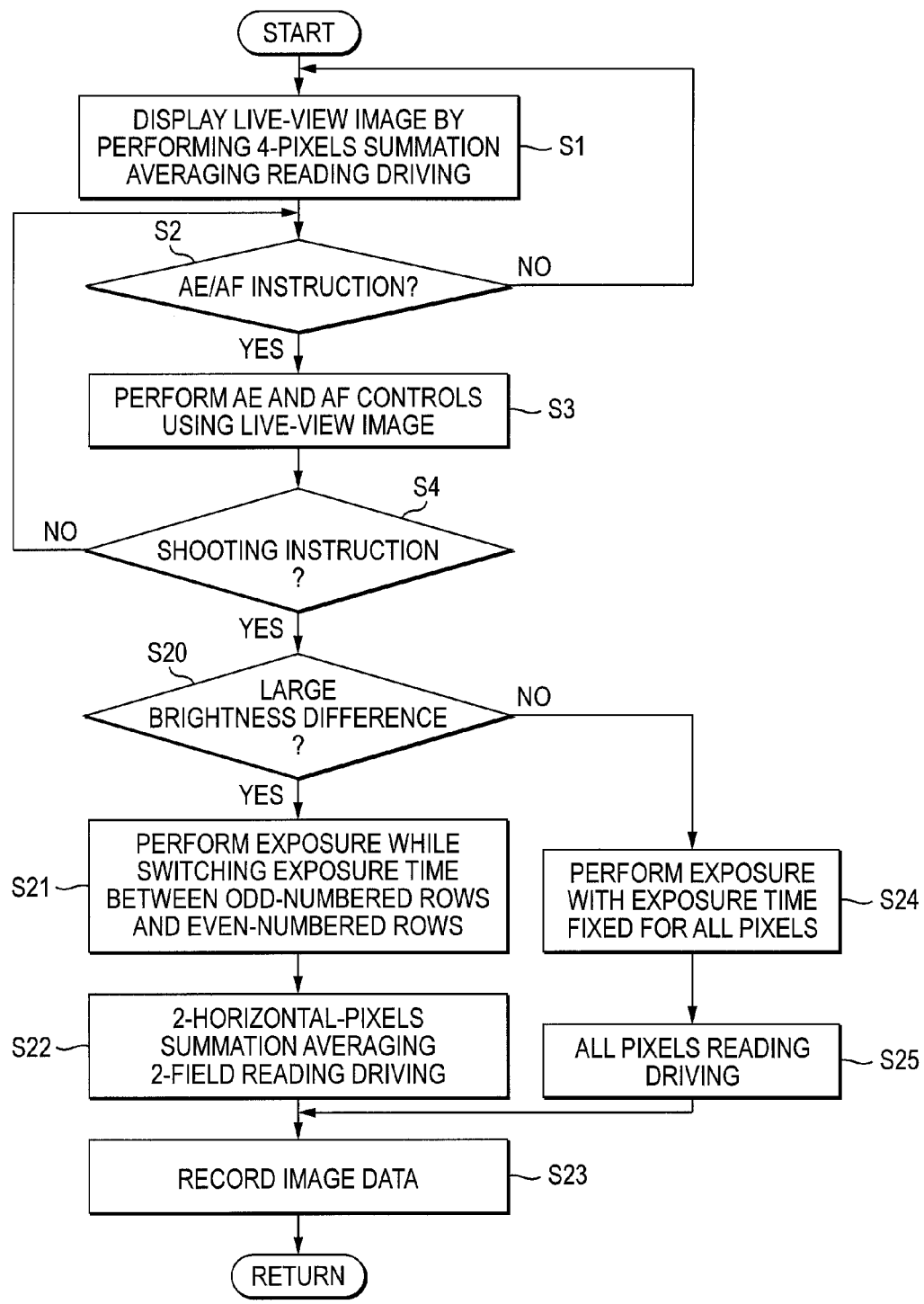
FIG. 13 is a flowchart for description of a modified operation which is performed by the digital camera shown in FIG. 1 in taking a still image.

FIG. 13 is a flowchart for description of a modified operation which is performed by the digital camera shown in FIG. 1 in taking a still image. In FIG. 13, steps having the same steps in FIG. 12 are given the same reference symbols as the latter. And descriptions for those steps will be omitted.

If the judgment result of step S4 is affirmative, the system control unit 11 analyzes a subject being shot using a shot image signal acquired from the solid-state imaging device 5 at the time of reception of the shooting instruction.

If the analysis result is such that the subject has a region where the brightness difference is larger than a prescribed value (step S20: yes), the system control unit 11 instructs the imaging device drive unit 10 to perform driving of switching the exposure time between the pixel cells 53 of the odd-numbered rows and the pixel cells 53 of the even-numbered rows and 2-field reading driving.

In response to this instruction, the imaging device drive unit 10 exposes the solid-state imaging device 5 to light while switching the exposure time between the pixel cells 53 of the odd-numbered rows of the solid-state imaging device 5 and the pixel cells 53 of its even-numbered rows (step S21).

Upon completion of the exposure, as shown in FIG. 8, the imaging device drive unit 10 performs 2-horizontal-pixels summation averaging reading driving using two fields separately (step S22).

As a result of the driving of step S22, the solid-state imaging device 5 outputs a first shot image signal consisting of imaging signals that correspond to half of the pixel cells 53 of the odd-numbered rows and a second shot image signal consisting of imaging signals that correspond to half of the pixel cells 53 of the even-numbered rows.

The digital signal processing unit 17 generates a dynamic-range-expanded shot image signal by adding together imaging signals of the same color, corresponding to adjoining positions, of the first shot image signal and the second shot image signal. The digital signal processing unit 17 generates shot image data having a wide dynamic range by processing the generated shot image signal, compressing it, and records the compressed shot image data in the recording medium 21 (step S23).

If the analysis result is such that the subject has no region where the brightness difference is larger than the prescribed value (step S20: no), the system control unit 11 instructs the imaging device drive unit 10 to start exposure of the pixel cells 53 and perform all pixels reading driving.

In response to this instruction, the imaging device drive unit 10 starts exposure of the solid-state imaging device 5 (step S24). The exposure is performed in such a manner that the exposure time is fixed for all the pixel cells 53.

After completion of the exposure, the imaging device drive unit 10 performs all pixels reading driving (step S25). As a result of this driving, a shot image signal consisting of imaging signals corresponding to all the pixel cells 53 is output from the solid-state imaging device 5. Shot image data obtained by processing this shot image signal with the digital signal processing unit 17 is recorded in the recording medium 21 (step S23).

Shot image data whose image quality is most suitable for a subject can be obtained switching between the 2-horizontal-pixels summation averaging reading driving and the all pixels reading driving in accordance with the brightness difference of a subject.

If the judgment result of step S20 in FIG. 13 is negative, the system control unit 11 may instruct the imaging device drive unit 10 to perform one of the all pixels reading driving, the 2-horizontal-pixels summation averaging reading driving or 2-diagonal-pixels summation reading driving, and the 4-pixels summation averaging reading driving in accordance with the shooting ISO sensitivity or the brightness of a subject. This makes it possible to obtain low-noise shot image data.

Figure 14:
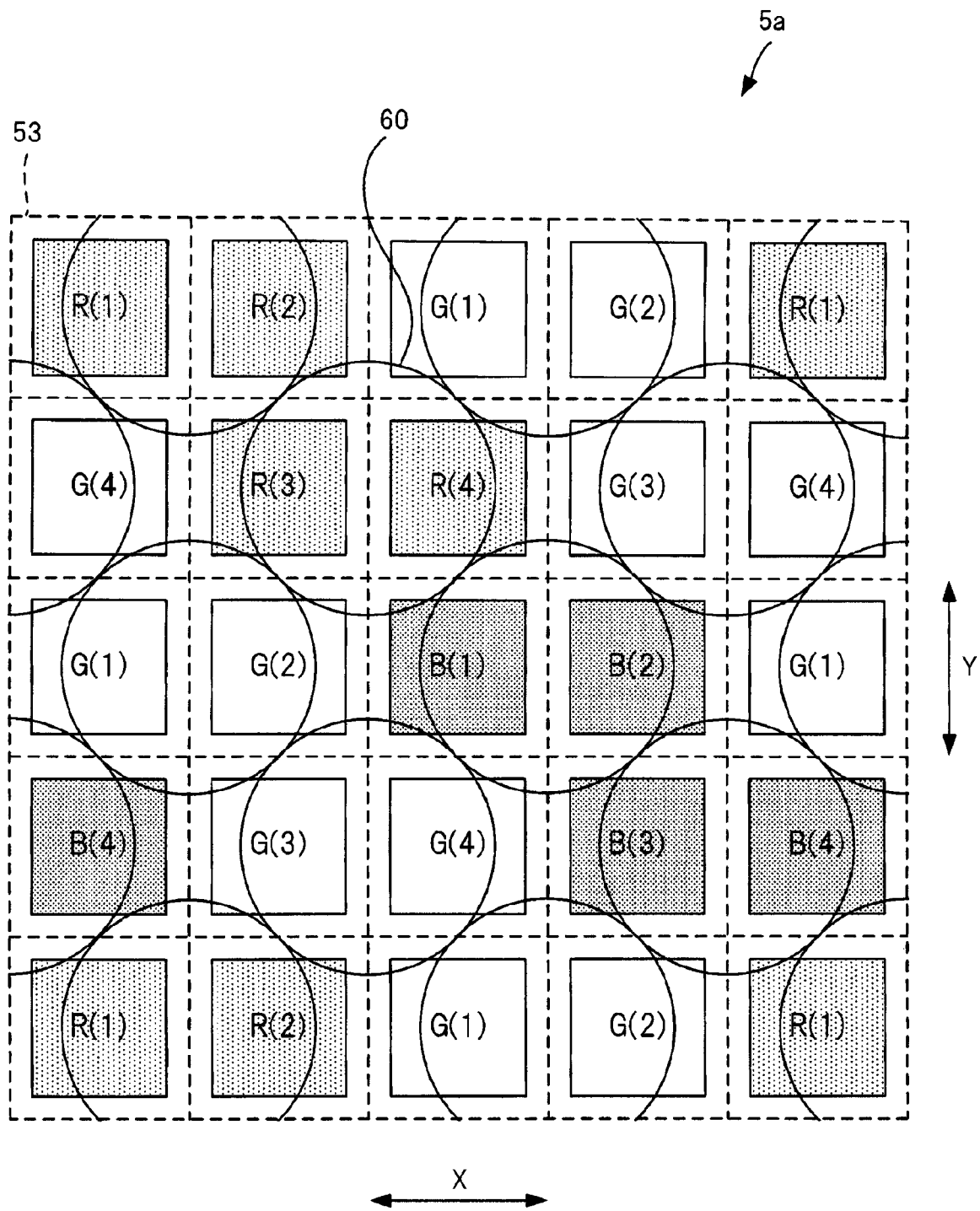
FIG. 14 is a plan view of a solid-state imaging device 5a which is a modification of the solid-state imaging device 5 of the digital camera shown in FIG. 1.

FIG. 14 is a plan view, corresponding to FIG. 3, of a solid-state imaging device 5a which is a modification of the solid-state imaging device 5 of the digital camera shown in FIG. 1. In FIG. 14, the constituent elements other than the pixel cells 53 and the photoelectric conversion elements provided inside the respective pixel cells 53 are omitted.

The solid-state imaging device 5a is characterized in that a microlens that is common to each pair of pixel cells 53 of the same kind that are adjacent to each other in the row direction X is disposed over their photoelectric conversion elements.

As shown in FIG. 14, one microlens 60 is provided so as to correspond to each pair of pixel cells 53 of the same kind that are adjacent to each other in the row direction X.

Each microlens 60 is disposed over the photoelectric conversion elements of the two associated photoelectric conversion elements so as to cover both of them.

Referring to FIG. 14, the regions that are not covered with the microlenses 60 are shielded from light by a light shield film (not shown). Each microlens 60 covers parts of photoelectric conversion elements that are not associated with it, and those parts are also covered with the light shield film.

The two photoelectric conversion elements located under each microlens 60 are to receive light beams that have passed through different pupil regions of the imaging lens 1. Therefore, there occurs a deviation (phase difference) between a first optical image that is taken by one of the two photoelectric conversion elements located under each microlens 60 and a second optical image that is taken by the other photoelectric conversion element.

Therefore, a focusing state of the imaging lens 1 can be detected from a deviation between the first optical image and the second optical image. The first optical image and the second optical image correspond to images that are obtained when the same subject is viewed from different viewing points. Therefore, it becomes possible to take, using these two optical images, a 3D image that enables stereoscopic vision.

Figure 15:
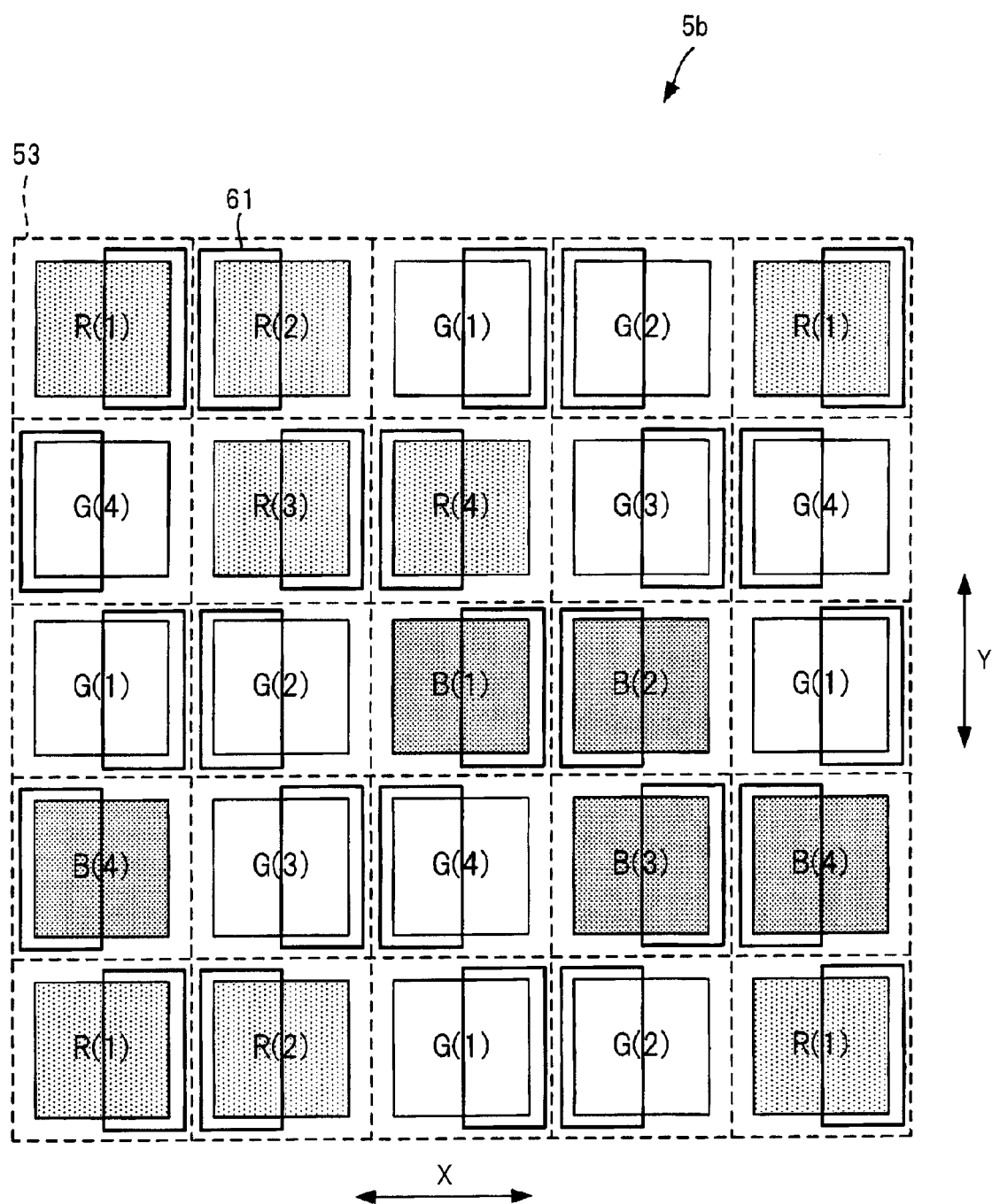
FIG. 15 is a plan view of a solid-state imaging device 5b which is a modification of the solid-state imaging device 5a shown in FIG. 14.

FIG. 15 is a plan view of a solid-state imaging device 5b which is a modification of the solid-state imaging device 5a shown in FIG. 14.

In the solid-state imaging device 5b, one microlens is disposed over the photoelectric conversion element of each pixel cell 53. And an optical aperture 61 of the left one of each pair of pixel cells 53 of the same kind that are adjacent to each other in the row direction X is deviated rightward from the center of the microlens of the left pixel cells 53. For example, a part of a light shield film that is formed over the photoelectric conversion element is formed with an opening only on the right side of the center of the microlens concerned.

An optical aperture 61 of the right pixel cell 53 is deviated leftward from the center of the microlens of the right pixel cells 53. The optical aperture 61 means a region, to be illuminated with light, of the photoelectric conversion element included in a pixel cell 53. For example, a part of the light shield film that is formed over the photoelectric conversion element is formed with an opening only on the left side of the center of the microlens concerned.

In this configuration, the two photoelectric conversion elements included in each pair of pixel cells 53 of the same kind that are adjacent to each other in the row direction X are to receive light beams that have passed through different pupil regions of the imaging lens 1.

Therefore, there occurs a deviation (phase difference) between an optical image that is taken by the pixel cell 53 having the rightward-deviated optical aperture 61 and an optical image that is taken by the pixel cell 53 having the leftward-deviated optical aperture 61.

Therefore, like the solid-state imaging device 5a, the solid-state imaging device 5b enables detection of a focusing state of the imaging lens 1 and taking of a 3D image.

Next, a description will be made of how a digital camera incorporating the solid-state imaging device 5a or 5b instead of the solid-state imaging device 5 operates.

Figure 16:
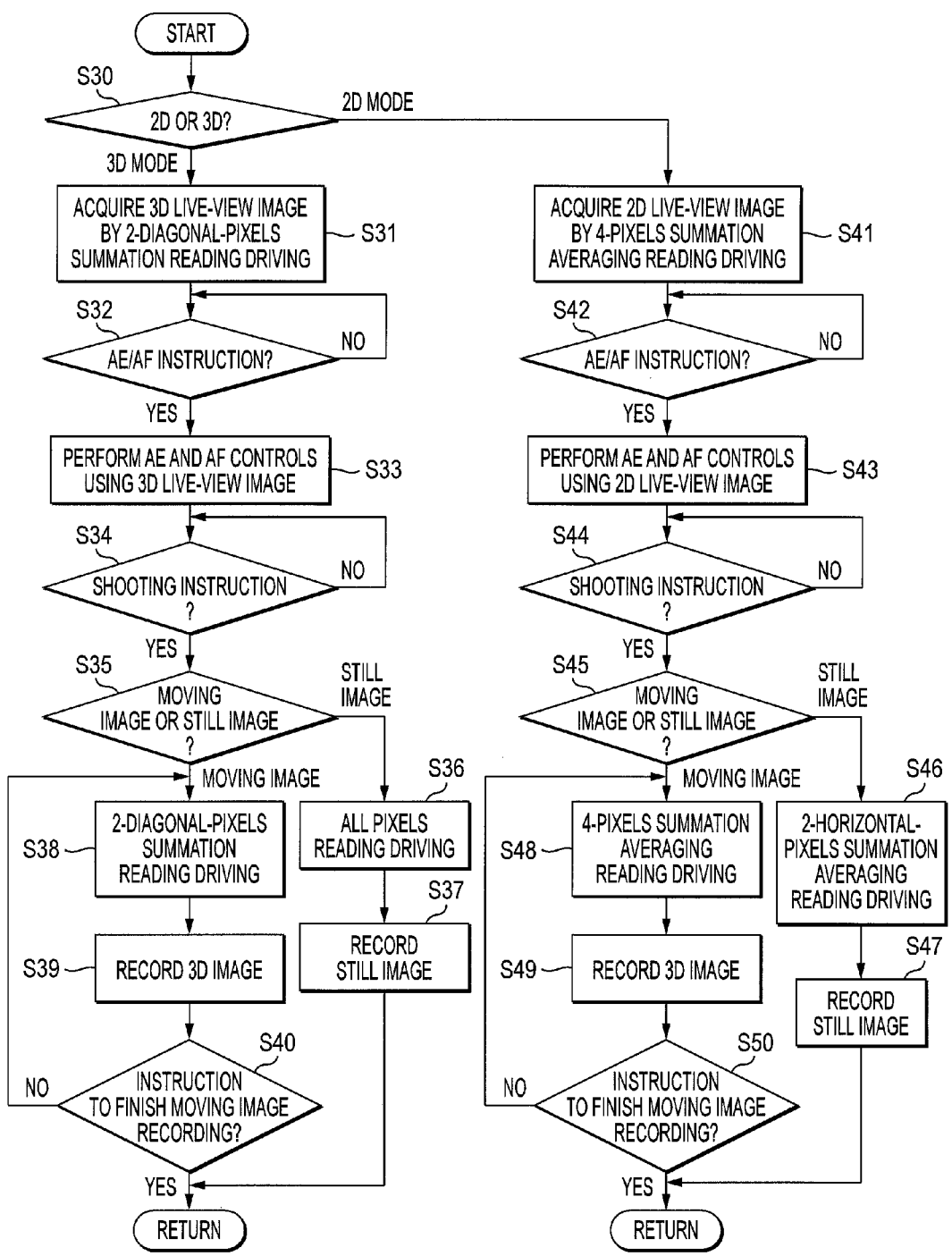
FIG. 16 is a flowchart for description of how a digital camera operates which incorporates the solid-state imaging device 5a or 5b in place of the solid-state imaging device 5 shown in FIG. 1.

FIG. 16 is a flowchart for description of how a digital camera operates which incorporates the solid-state imaging device 5a or 5b in place of the solid-state imaging device 5 shown in FIG. 1.

In this digital camera, it is possible to set a 3D shooting mode in which two shot image data obtained by shooting the same subject from different viewing points can be recorded in the recording medium 21 and a 2D shooting mode in which one shot image data obtained by shooting a subject from a single viewing point can be recorded in the recording medium 21. Moving image shooting and still image shooting can be performed in each shooting mode.

A liquid crystal display unit 23 which is incorporated in this digital camera is such as to be able to display two shot image data having a parallax so as to enable stereoscopic vision.

If the 3D mode is set (step S30: 3D), the system control unit 11 starts moving image shooting for display of a live-view image using the solid-state imaging device 5a (5b).

To perform 3D moving image shooting for acquisition of a live-view image, the imaging device drive unit 10 causes the solid-state imaging device 5a (5b) to output shot image signals sequentially by performing 2-diagonal-pixels summation reading driving on a frame-by-frame basis.

Each shot image signal that is output from the solid-state imaging device 5a (5b) being subjected to this driving includes a right-eye shot image signal consisting of imaging signals corresponding to the pixel cells 53(1) and 53(3) and a left-eye shot image signal consisting of imaging signals corresponding to the pixel cells 53(2) and 53(4). The right-eye shot image signal and the left-eye shot image signal correspond to signals obtained by shooting the same subject from different viewing points.

The digital signal processing unit 17 generates right-eye shot image data and left-eye shot image data by processing the right-eye shot image signal and the left-eye shot image signal, respectively. The generated two shot image data are displayed on the display unit 23 under the control of the display control unit 22 so as to enable stereoscopic vision (step S31). As a result of the execution of the above steps, a live-view image that enables stereoscopic vision is displayed on the display unit 23.

Upon reception of an AE/AF instruction during the live-view image shooting (step S32: yes), the system control unit 11 performs an AE control and an AF control using right-eye shot image data and left-eye shot image data that are acquired at the time of reception of the instruction (step S33). Detection of a focusing state for the AF control is done by detecting a phase difference between the right-eye shot image data and left-eye shot image data.

If a shooting instruction is made (step S34: yes) after the AE control and the AF control have been performed by the system control unit 11 and the shooting instruction is a still image shooting instruction (step S35: still image), the system control unit 11 instructs the imaging device drive unit 10 to start exposure of the solid-state imaging device 5a (5b) and perform all pixels reading driving.

In response to this instruction, the imaging device drive unit 10 starts exposure of the solid-state imaging device 5. After completion of the exposure, the imaging device drive unit 10 performs all pixels reading driving (step S36).

A shot image signal that is output from the solid-state imaging device 5a (5b) as a result of the driving performed at step S36 includes a right-eye shot image signal corresponding to the pixel cells 53(1) and 53(3) and a left-eye shot image signal corresponding to the pixel cells 53(2) and 53(4). Each of the right-eye shot image signal and the left-eye shot image signal consists of imaging signals the number of which is half of the total number of the pixel cells 53.

The digital signal processing unit 17 generates right-eye shot image data and left-eye shot image data by processing the right-eye shot image signal and the left-eye shot image signal, respectively.

The digital signal processing unit 17 generates 3D image data by correlating the generated right-eye shot image data and left-eye shot image data with each other, and records the generated 3D image data in the recording medium 21 (step S37).

For example, the 3D image data is data in the MPO format which is a standard of The Camera & Imaging Products Association (CIPA). After the execution of step S37, the system control unit 11 causes the process to return to step S31.

If the shooting instruction made at step S34 is a moving image shooting instruction (step S35: moving image), the system control unit 11 instructs the imaging device drive unit 10 to start exposure of the solid-state imaging device 5a (5b) and perform 2-diagonal-pixels summation reading driving.

In response to this instruction, the imaging device drive unit 10 starts exposure of the solid-state imaging device 5. After completion of the exposure, the imaging device drive unit 10 performs 2-diagonal-pixels summation reading driving (step S38). The imaging device drive unit 10 performs the above driving for each moving image frame.

A shot image signal that is output from the solid-state imaging device 5a (5b) as a result of the driving performed at step S38 includes a right-eye shot image signal corresponding to the pixel cells 53(1) and 53(3) and a left-eye shot image signal corresponding to the pixel cells 53(2) and 53(4). Each of the right-eye shot image signal and the left-eye shot image signal consists of imaging signals the number of which is half of the total number of the pixel cells 53.

The digital signal processing unit 17 generates right-eye shot image data and left-eye shot image data by processing the right-eye shot image signal and the left-eye shot image signal, respectively. The digital signal processing unit 17 generates 3D image data by correlating the generated right-eye shot image data and left-eye shot image data with each other, and records the generated 3D image data in the recording medium 21 (step S39).

The system control unit 11 executes steps S38 and S39 repeatedly until an instruction to finish the moving image recording is received. Upon reception of an instruction to finish the moving image recording (step S40: yes), the system control unit 11 causes the process to return to step S31.

If the 2D mode is set at step S30 (step S30: 2D), the system control unit 11 starts moving image shooting for display of a live-view image using the solid-state imaging device 5*a* (5*b*).

To perform 2D moving image shooting for acquisition of a live-view image, the imaging device drive unit 10 causes the solid-state imaging device 5*a* (5*b*) to output shot image signals sequentially by performing 4-pixels summation averaging reading driving on a frame-by-frame basis.

Each shot image signal that is output from the solid-state imaging device 5*a* (5*b*) being subjected to this driving correspond to a signal obtained by shooting a subject from a single viewing point.

The digital signal processing unit 17 generates shot image data by processing the shot image signal. The generated shot image data is displayed on the display unit 23 under the control of the display control unit 22 (step S41). As a result of the execution of the above steps, a non-stereoscopic live-view image is displayed on the display unit 23.

Upon reception of an AE/AF instruction during the live-view image shooting (step S42: yes), the system control unit 11 performs an AE control and an AF control using a shot image signal that is acquired at the time of reception of the instruction (step S43). The AF control is performs in the form of contrast AF.

If a shooting instruction is made (step S44: yes) after the AE control and the AF control have been performed by the system control unit 11 and the shooting instruction is a still image shooting instruction (step S45: still image), the system control unit 11 instructs the imaging device drive unit 10 to start exposure of the solid-state imaging device 5*a* (5*b*) and perform 2-horizontal-pixels summation averaging reading driving.

In response to this instruction, the imaging device drive unit 10 starts exposure of the solid-state imaging device 5. After completion of the exposure, the imaging device drive unit 10 performs 2-horizontal-pixels summation averaging reading driving (step S46).

A shot image signal that is output from the solid-state imaging device 5*a* (5*b*) as a result of the driving performed at step S46 corresponds to a signal obtained by shooting a subject from a single viewing point.

The digital signal processing unit 17 generates shot image data by processing the shot image signal and records the generated shot image data in the recording medium 21 (step S47). After the execution of step S47, the system control unit 11 causes the process to return to step S41.

If the shooting instruction made at step S44 is a moving image shooting instruction (step S45: moving image), the system control unit 11 instructs the imaging device drive unit 10 to start exposure of the solid-state imaging device 5*a* (5*b*) and perform 4-pixels summation averaging reading driving.

In response to this instruction, the imaging device drive unit 10 starts exposure of the solid-state imaging device 5. After completion of the exposure, the imaging device drive unit 10 performs 2-pixels summation averaging reading driving (step S48). The imaging device drive unit 10 performs the above driving for each moving image frame.

A shot image signal that is output from the solid-state imaging device 5*a* (5*b*) as a result of the driving performed at step S48 corresponds to a signal obtained by shooting a subject from a single viewing point.

The digital signal processing unit 17 generates shot image data by processing the shot image signal and records the generated shot image data in the recording medium 21 (step S49).

The system control unit 11 executes steps S48 and S49 repeatedly until an instruction to finish the moving image recording is received. Upon reception of an instruction to finish the moving image recording (step S50: yes), the system control unit 11 causes the process to return to step S41.

Figure 17:
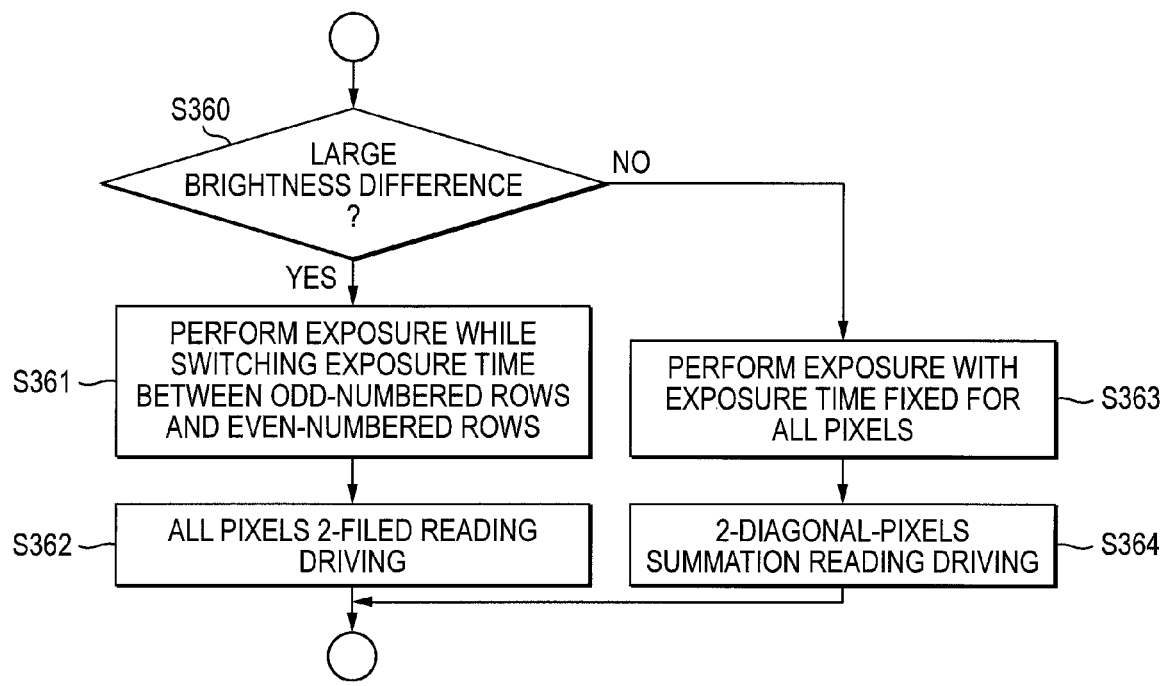
FIG. 17 is a flowchart of a modified version of step S37 shown in FIG. 16.

A process shown in FIG. 17 may be performed instead of step S36 shown in FIG. 16.

More specifically, the system control unit 11 analyzes shot image data that is acquired at the time of reception of the shooting instruction. If there exists a region where the brightness difference is larger than a prescribed value (step S360: yes), the system control unit 11 causes the imaging device drive unit 10 to perform driving of switching the exposure time between the pixel cells 53 of the odd-numbered rows and the pixel cells 53 of the even-numbered rows (step S361).

After completion of the exposure, the imaging device drive unit 10 performs 2 fields reading driving and causes a shot image signal corresponding to the pixel cells 53 of the odd-numbered rows and a shot image signal corresponding to the pixel cells 53 of the even-numbered rows to be output independently (step S362).

After the execution of step S362, the digital signal processing unit 17 performs processing of adding together each pair of imaging signals obtained from two pixel cells 53 that share the associated floating diffusion layer 55, for the shot image signal corresponding to the pixel cells 53 of the odd-numbered rows and the shot image signal corresponding to the pixel cells 53 of the even-numbered rows.

As a result, a dynamic-range-expanded shot image signal is obtained. The digital signal processing unit 17 generates right-eye image data and left-eye image data by processing this shot image signal, and generates 3D image data in which the right-eye image data and the left-eye image data are correlated with each other. At step S37, the 3D image data is recorded in the recording medium 21.

If the analysis of step S360 does not find any region where the brightness difference is larger than the prescribed value (step S360: no), the system control unit 11 causes all the pixel cells 53 to be exposed for the same exposure time (step S363). After completion of the exposure, the system control unit 11 causes 2-diagonal-pixels summation reading driving.

Three dimensional image data is generated from a shot image signal that is output from the solid-state imaging device 5*a* (5*b*) as a result of this driving. The generated 3D image data is recorded in the recording medium 21 at step S37.

Alternatively, all pixels reading driving may be performed at step S364 shown in FIG. 17.

Figure 18:
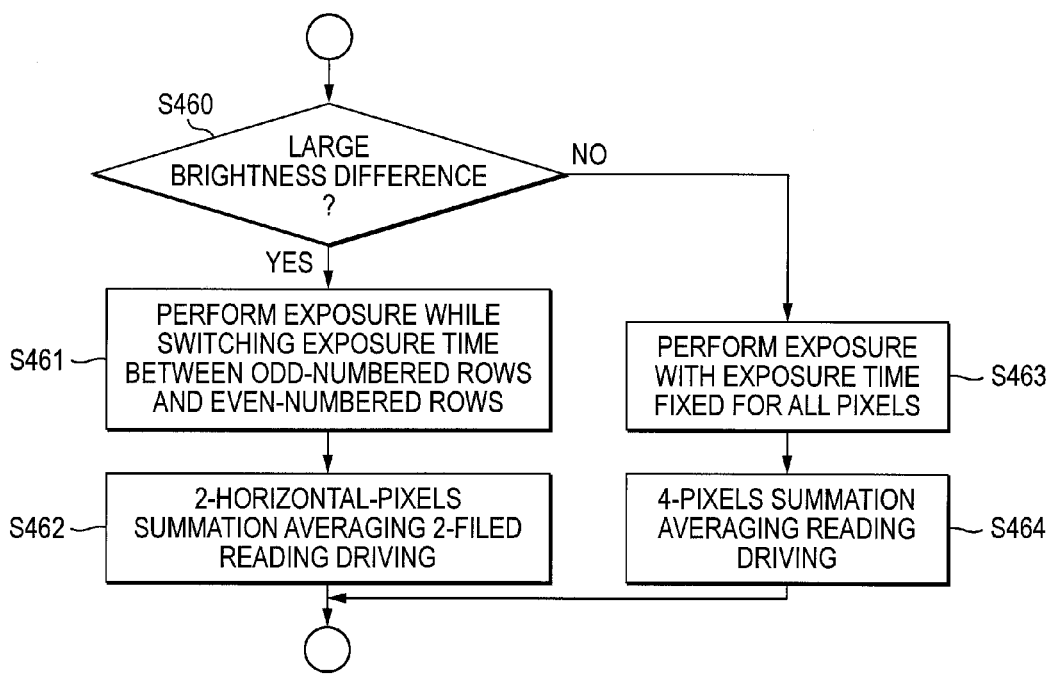
FIG. 18 is a flowchart of a modified version of step S46 shown in FIG. 16.

Likewise, a process shown in FIG. 18 may be performed instead of step S46 shown in FIG. 16.

More specifically, the system control unit 11 analyzes shot image data that is acquired at the time of reception of the shooting instruction. If there exists a region where the brightness difference is larger than a prescribed value (step S460: yes), the system control unit 11 causes the imaging device drive unit 10 to perform driving of switching the exposure time between the pixel cells 53 of the odd-numbered rows and the pixel cells 53 of the even-numbered rows (step S461).

After completion of the exposure, the imaging device drive unit 10 performs 2-horizontal-pixels summation averaging reading driving using two fields separately and causes a shot image signal corresponding to the pixel cells 53 of the odd-numbered rows and a shot image signal corresponding to the pixel cells 53 of the even-numbered rows to be output independently (step S462).

After the execution of step S462, the digital signal processing unit 17 performs processing of adding together imaging signals obtained from the same unit, for the shot image signal corresponding to the pixel cells 53 of the odd-numbered rows and the shot image signal corresponding to the pixel cells 53 of the even-numbered rows.

As a result, a dynamic-range-expanded shot image signal is obtained. The digital signal processing unit 17 generates shot image data by processing this shot image signal and records the generated shot image data in the recording medium 21.

If the analysis of step S460 does not find any region where the brightness difference is larger than the prescribed value (step S460: no), the system control unit 11 causes all the pixel cells 53 to be exposed for the same exposure time (step S463). After completion of the exposure, the system control unit 11 causes 4-pixels summation averaging reading driving. Shot image data is generated from a shot image signal that is output from the solid-state imaging device 5a (5b) as a result of this driving. The generated shot image data is recorded in the recording medium 21 at step S37.

Alternatively, 2-horizontal-pixels summation averaging reading driving may be performed at step S464 shown in FIG. 18.

As described above, in the digital camera incorporating the solid-state imaging device 5a (5b), switching between 3D moving image shooting, 3D still image shooting, 2D moving image shooting, and 2D still image shooting can easily be made merely by switching the driving method.

In the solid-state imaging device 5a, approximately circular microlenses 60 can be laid close to each other in the manner shown in FIG. 14 because the pixel cells 53(3) and the pixel cells 53(4) are deviated diagonally from the pixel cells 53(1) and the pixel cells 53(2), respectively.

In a solid-state imaging device that is different from the solid-state imaging device 5a in that the even-numbered pixel cell rows are shifted leftward by on pixel cell, microlenses 60 need to have a shape that is long in the row direction X. This disables employment of a general-purpose manufacturing method and hence increases the manufacturing cost.

The solid-state imaging device 5a, which makes it possible to employ a general-purpose manufacturing method as it is, and hence enables cost reduction. Since the microlenses 60 can be made approximately circular, the optical characteristics can be made stable and the quality of a shot image can be enhanced.

In the solid-state imaging devices 5, 5a, and 5b, since the pixel cells 53(3) and the pixel cells 53(4) are deviated diagonally from the pixel cells 53(1) and the pixel cells 53(2), respectively, the spatial arrangement of imaging signals of a shot image signal that is obtained when the 2-horizontal-pixels summation averaging driving shown in FIG. 8 is performed becomes a honeycomb arrangement as indicated by marks "o" in FIG. 9. This makes it possible to obtain high-resolution shot image data even in the case where pixel cell signals are added together.

Although in the above description all the pixel cells 53 included in the solid-state imaging device are made subjects of signal reading, the pixel cells 53 as the subjects of signal reading may be determined in accordance with the number of pixels that are necessary for shot image data, the frame rate of a moving image, or the like. For example, to take an HD moving image, only a central part of the pixel cells 53 of the solid-state imaging device may be employed as subjects of signal reading.

Next, a description will be made of the configuration of a smartphone which serves as an imaging apparatus.

Figure 19:
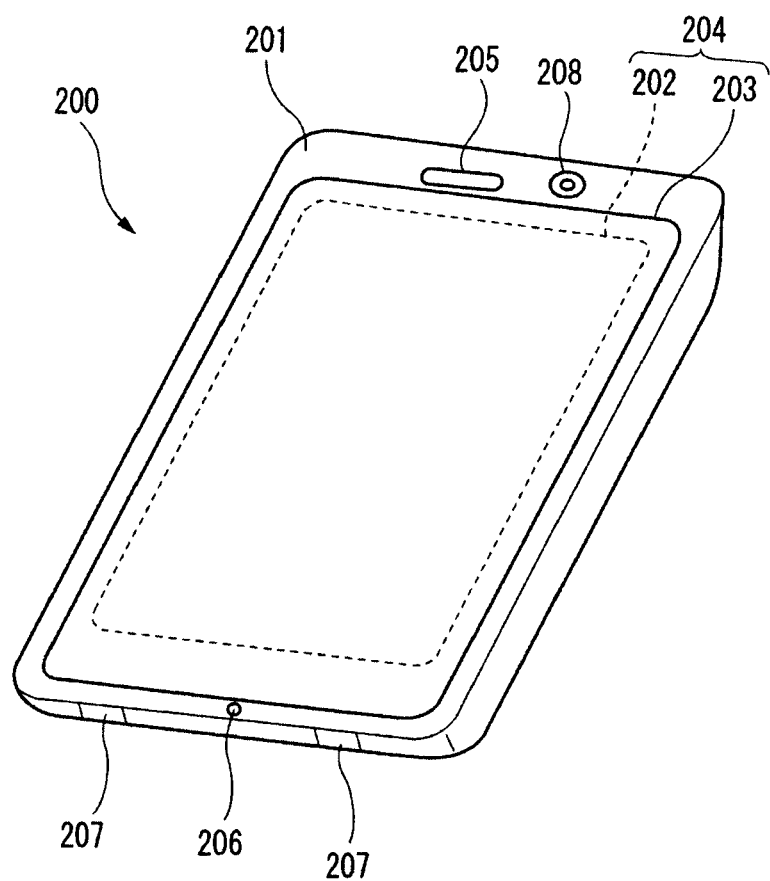
FIG. 19 shows a smartphone which serves as an imaging apparatus.

FIG. 19 shows an appearance of a smartphone 200 which is an imaging apparatus according to an embodiment of the invention. The smartphone 200 shown in FIG. 19 has a flat-plate-shaped body 201, and one surface of the body 201 is provided with a display/input unit 204 which is an integrated unit of a display panel 202 and a manipulation panel 203 which serves as an input unit. The body 201 is also equipped with a speaker 205, a microphone 206, manipulation members 207, and a camera unit 208. The configuration of the body 201 is not limited to the above; for example, configurations are possible in which the display unit and the input unit are independent of each other or a folding structure or a slide mechanism is employed.

Figure 20:
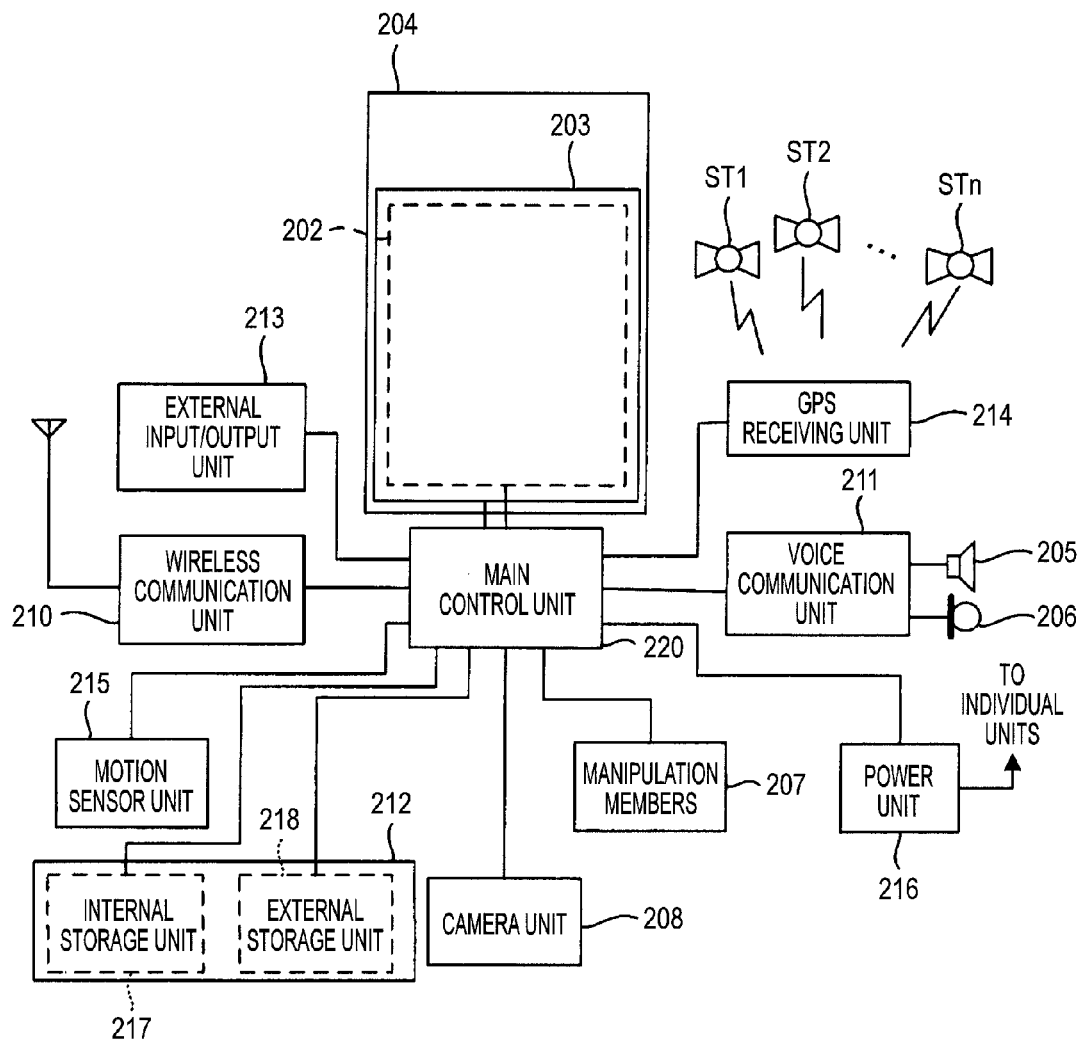
FIG. 20 is a block diagram showing the internal configuration of the smartphone shown in FIG. 19.

FIG. 20 is a block diagram showing the configuration of the smartphone 200 shown in FIG. 19. As shown in FIG. 20, the smartphone 200 is equipped with, as main components, a wireless communication unit 210, the display/input unit 204, a voice communication unit 211, the manipulation members 207, the camera unit 208, a storage unit 212, an external input/output unit 213, a GPS (global communication system) receiving unit 214, a motion sensor unit 215, a power unit 216, and a main control unit 220. The smartphone 200 is also provided with, as a main function, a wireless communication function of performing a mobile wireless communication with a base station apparatus BS (not shown) over a mobile communication network NW (not shown).

The wireless communication unit 210 is a unit for performing wireless communications with a base station apparatus BS of the mobile communication network NW according to instructions supplied from the main control unit 220. By performing such wireless communications, the wireless communication unit 210 sends and receives audio data, various kinds of file data such as image data, e-mail data, etc. and receives Web data, streaming data, etc.

Controlled by the main control unit 220, the display/input unit 204, which has the display panel 202 and the manipulation panel 203, is what is called a touch screen which gives information to the user visually by displaying an image (still image or moving image), text information, etc. and detects a user manipulation that is performed on displayed information.

The display panel 202 employs an LCD (liquid crystal display), an OELD (organic electroluminescence display), or the like as a display device.

The manipulation panel 203, which is placed so that an image displayed on the display surface of the display panel 202 is viewable, is a device which is manipulated by a user finger or a stylus pen and detects one or plural sets of coordinates. When manipulated by a user finger or a stylus pen, this device outputs a detection signal that is generated as a result of the manipulation to the main control unit 220. Subsequently, the main control unit 220 detects a manipulation position (coordinates) on the display panel 202 on the basis of the received detection signal.

As shown in FIG. 19, in the smartphone 200 which is the imaging apparatus according to one embodiment of the invention, the display panel 202 and the manipulation panel 203 are integrated to constitute the display/input unit 204 with an arrangement that the display panel 202 is completely covered with the manipulation panel 203.

Where this arrangement is employed, the manipulation panel 203 may have a function of detecting a user manipulation made in an area that is outside the display panel 202. In other words, the manipulation panel 203 may have a detection area (hereinafter referred to as a display area) of a portion where it coextends with the display panel 202 and a detection area (hereinafter referred to as a non-display area) of the other, peripheral portion where it does not coextend with the display panel 202.

Although the size of the display area may be made completely equal to that of the display panel 202, they need not always be identical. The manipulation panel 203 may have two sensing areas in a peripheral portion and the other, inside portion, respectively. Furthermore, the peripheral portion may be designed so as to have a width that is suitable for, for example, the size of the body 201. Still further, the position detection method of the manipulation panel 203 may be any of various methods such as a matrix switch method, a resistive film method, a surface acoustic wave method, an infrared method, an electromagnetic induction method, and a capacitance method.

Provided with the speaker 205 and the microphone 206, the voice communication unit 211 is a unit for converting a user voice that is input through the microphone 206 into audio data that can be processed by the main control unit 220 and outputting the audio data to the main control unit 220 and for decoding audio data received by the wireless communication unit 210 or the external input/output unit 213 and outputting resulting audio data from the speaker 205. As shown in FIG. 19, for example, the speaker 205 may be disposed in the same surface as the display/input unit 204 is and the microphone 206 may be disposed in a surface of the body 201.

The manipulation members 207 are hardware keys using key switches or the like and serve to receive an instruction from the user. For example, as shown in FIG. 19, the manipulation members 207 are push button type switches which are disposed in a side surface of the body 201 of the smartphone 200 and which are turned on when pushed by a finger or the like and turned off by the resilience of a spring or the like when the finger is released.

The storage unit 212 is a unit for storing control programs and control data for the main control unit 220, application software, address data that correlate names, telephone numbers, etc. of parties to communicate with, data of sent and received e-mails, Web data downloaded by Web browsing, and downloaded content data and for storing streaming data etc. temporarily. The storage unit 212 consists of an internal storage unit 217 incorporated in the smartphone 200 and an external storage unit 218 having detachable external memory slots. Each of the internal storage unit 217 and the external storage unit 218 which constitute the storage unit 212 is realized by using a storage medium such as a flash memory type memory, a hard disk type memory, a multimedia card micro type memory, a card type memory (e.g., micro SD (registered trademark) memory), a RAM (random access memory), or a ROM (read-only memory).

The external input/output unit 213 serves as interfaces with all external devices that can be connected to the smartphone 200, and serves to connect to an external device directly or indirectly through a communication or the like (e.g., universal serial bus (USB) or IEEE 1394) or over a network (e.g., Internet, wireless LAN, Bluetooth (registered trademark), RFID (Radio Frequency Identification; registered trademark), infrared communication (IrDA: Infrared Data Association; registered trademark), UWB (Ultra Wideband; registered trademark), or ZigBee (registered trademark)).

Example external devices that can be connected to the smartphone 200 are a wired/wireless headset, a wired/wireless external charger, a wired/wireless data port, a memory card or a SIM (subscriber identity module)/UIM (user identity module) card which is connected through a card socket, an external audio/video device which is connected through an audio/video I/O (input/output) terminal, an external audio/video device which is connected wirelessly, a smartphone which is connected by wire or wirelessly, a personal computer which is connected by wire or wirelessly, a PDA which is connected by wire or wirelessly, and an earphone. The external input/output unit 213 enables supply of data transmitted from such an external device to the individual internal components of the smartphone 200 and supply of internal data of the smartphone 200 to such an external device.

The GPS receiving unit 214 receives plural GPS signals transmitted from GSP satellites ST1-STn, performs positioning calculation on the basis of the received GPS signals, and detects a position (latitude, longitude, and height) of the smartphone 200, according to instructions from the main control unit 220. If the GPS receiving unit 214 can acquire position information from the wireless communication unit 210 or the external input/output unit 213 (e.g., over a wireless LAN), it can detect a position using that position information.

Equipped with, for example, a 3-axis acceleration sensor, the motion sensor unit 215 detects a physical movement of the smartphone 200. A movement direction and acceleration of the smartphone 200 is detected as a result of detection of a physical movement of the smartphone 200. A detection result is output to the main control unit 220.

The power unit 216 supplies power (stored in a battery (not shown)) to the individual units of the smartphone 200 according to an instruction from the main control unit 220.

Having a microprocessor, the main control unit 220 operates according to control programs and control data stored in the storage unit 212 and thereby supervises the individual units of the smartphone 200. The main control unit 220 has a mobile communication control function of controlling the communication-related units to perform a voice communication or a data communication through the wireless communication unit 210, as well as application processing functions.

Each application processing function is realized in such a manner that the main control unit 220 operates according to application software that is stored in the storage unit 212. Example application processing functions are an infrared communication function of performing a data communication with a device opposed to the smartphone 200 by controlling the external input/output unit 213, an e-mail function of sending and receiving an e-mail, and a Web browsing function of browsing a Web page.

The main control unit 220 also has an image processing function of, for example, displaying video on the display/input unit 204 on the basis of image data (still image or moving image data) such as received data or downloaded streaming data. The image processing function means a function of decoding image data as mentioned above, performing image processing on a decoding result, and displaying a resulting image on the display/input unit 204.

The main control unit 220 also performs a display control on the display panel 202 and a manipulation detection control for detecting a user manipulation made through the manipulation members 207 or the manipulation panel 203. By performing a display control, the main control unit 220 displays icons for activating respective pieces of application software, software keys such as a scroll bar, or a window for writing an e-mail. The scroll bar means a software key for receiving an instruction for moving a display portion of, for example, a large image that cannot be fully displayed in the display area of the display panel 202.

By performing a manipulation detection control, the main control unit 220 detects a user manipulation made through the manipulation members 207, receives, through the manipulation panel 203, a manipulation on an icon as mentioned above or input of a character string to an input box of a window as mentioned above, or receives a display image scroll request made through a scroll bar.

Furthermore, the main control unit 220 has a touch panel control function of judging whether a manipulation position on the manipulation panel 203 is located in the portion (display area) that coextends with the display panel 202 or the other, peripheral portion (non-display area) that does not coextend with the display panel 202 and controlling the sensing area of the manipulation panel 203 and the display positions of software keys, by performing a manipulation detection control.

Still further, the main control unit 220 can detect a gesture manipulation made on the manipulation panel 203 and perform a preset function in accordance with the detected gesture manipulation. The gesture manipulation is not a conventional, simple touch manipulation but a manipulation of drawing a locus with a finger or the like, designating plural positions simultaneously, or drawing a locus from at least one of plural positions by combining the former two kinds of manipulations.

The camera unit 208 includes the part, excluding the external memory control unit 20, the recording medium 21, the display control unit 22, the display unit 23, and the manipulation unit 14, of the units of the digital camera shown in FIG. 1. Shot image data generated by the camera unit 208 can be stored in the storage unit 212 or output through the input/output unit 213 or the wireless communication unit 210. Although in the smartphone 200 shown in FIG. 19 the camera unit 208 is disposed in the same surface as the display/input unit 204, the camera unit 208 may be disposed at another position, for example, in the back surface of the display/input unit 204.

The camera unit 208 can be used for various functions of the smartphone 200. For example, an image taken by the camera unit 208 can be displayed on the display panel 202 and used as one item for input of a manipulation through the manipulation panel 203. The GPS receiving unit 214 can detect a position by referring to an image supplied from the camera unit 208. Furthermore, the optical axis direction of the camera unit 208 of the smartphone 200 or a current use environment can be judged by referring to an image supplied from the camera unit 208 with or without use of the 3-axis acceleration sensor. Naturally, an image supplied from the camera unit 208 can be used in application software.

Operations are possible that image data of a still image or a moving image is added with position information acquired by the GPS receiving unit 214, voice information acquired by the microphone 206 (and may be converted into text information by, for example, the main control unit through voice-text conversion), posture information acquired by the motion sensor unit 215, or like information and then stored in the recording unit 212 or output through the input/output unit 213 or the wireless communication unit 210.

In the smartphone 200 having the above configuration, the load an observer is to bear in enlarging a 3D image can be reduced by the main control unit 220's performing the same processing as the system control unit 11 of the digital camera 1 shown in FIG. 1 should do.

As described above, this specification discloses the following.

The disclosed solid-state imaging device is a solid-state imaging device in which plural pixel cells including G pixel cells each including a photoelectric conversion element for detecting green light, R pixel cells each including a photoelectric conversion element for detecting red light, and B pixel cells each including a photoelectric conversion element for detecting blue light are arranged two-dimensionally, wherein the plural pixel cells are arranged in such a manner that pixel cell rows each consisting of plural pixel cells arranged in a row direction at a constant pitch are arranged in a column direction which is perpendicular to the row direction; odd-numbered pixel cell rows are deviated from even-numbered pixel cell rows in the row direction by the pixel cell arrangement pitch in the row direction; in each of a first pixel cell group consisting of pixel cells belonging to odd-numbered rows and a second pixel cell group consisting of pixel cells belonging to even-numbered rows, first pixel cell rows in each of which sets of two G pixel cells and sets of two R pixel cells are arranged alternately in the row direction and second pixel cell rows in each of which sets of two B pixel cells and sets of two G pixel cells are arranged alternately in the row direction are arranged alternately in the column direction; in each of the first pixel cell group and the second pixel cell group, among the pixel cells belonging to the second pixel cell rows, the G pixel cells are located at positions corresponding to positions of the respective R pixel cells belonging to the first pixel cell rows and the B pixel cells are located at positions corresponding to positions of the respective G pixel cells belonging to the first pixel cell rows; in each of a pair of first pixel cell rows that are adjacent to each other in the column direction and a pair of second pixel cell rows that are adjacent to each other in the column direction, a pixel cell of the same kind as each pixel cell concerned is located at a position that is deviated in the row direction by the pixel cell arrangement pitch in the row direction and deviated in the column direction by the pixel cell arrangement pitch in the column direction from the pixel cell concerned; the pixel cell concerned and the pixel cell of the same kind as the pixel cell concerned constitute a pixel cell pair; and the solid-state imaging device comprises charge storage members which are provided so as to correspond to the respective pixel cells and store charges generated in the photoelectric conversion elements of the respective pixel cells, and signal output circuits which output signals corresponding to the charges stored in the respective pixel charge storage members, and the charge storage member and the signal output circuit corresponding to each pixel cell belonging to the first pixel cell group are commonized with the charge storage member and the signal output circuit corresponding to a pixel cell that is paired with the pixel cell belonging to the first pixel cell group, respectively.

With this configuration, even if a signal of each pixel cell belonging to the first pixel cell group and a signal of a pixel cell that is located at a position that is deviated in the row direction by the pixel cell arrangement pitch in the row direction and deviated in the column direction by the pixel cell arrangement pitch in the column direction from the pixel cell belonging to the first pixel cell group are added together, signals obtained by such additions do not have the same spatial position. Thus, it becomes possible to generate high-resolution shot image data.

When a signal of each pixel cell belonging to the first pixel cell group and a signal of a pixel cell that is located at a position that is deviated in the row direction by one pixel cell pitch are added together, a shot image signal having a honeycomb arrangement can be obtained. As a result, it becomes possible to generate high-resolution shot image data.

Performing the above additions within the solid-state imaging device makes it possible to increasing the reading rate of shot image signals.

Signals of each pixel cell belonging to the first pixel cell group and a pixel cell that is paired with the former can be added together in the form of charges, which makes it possible to high-sensitivity, low-noise shot image data. Furthermore, the reading rate of shot image signals can be increased.

The disclosed solid-state imaging device further comprises summation averaging elements for summation-averaging signals that are output from signal output circuits corresponding to pixel cells of the same kind that are adjacent to each other in the row direction.

With this configuration, a summation average of signals of pixel cells of the same kind that belong to the first pixel cell group and are adjacent to each other in the row direction can be obtained, which makes it possible to generate low-noise shot image data. It is also possible to add together, within the solid-state imaging device, signals of four pixel cells, that is, two pixel cells of the same kind that belong to the first pixel cell group and are adjacent to each other in the row direction and two pixel cells each of which is deviated from the corresponding one of the former two pixel cells in the row direction by one pixel cell pitch and in the column direction by one pixel cell row pitch. This enables high-speed reading.

In the disclosed solid-state imaging device, two pixel cells of the same kind that are adjacent to each other in the same pixel cell row are to detect light beams that pass through different pupil regions of an imaging optical system which is disposed in front of the solid-state imaging device.

In the disclosed solid-state imaging device, an approximately circular microlens is disposed over the photoelectric conversion elements of the two respective pixel cells of the same kind so as to cover the two photoelectric conversion elements.

The disclosed imaging apparatus comprises the above solid-state imaging device and a drive unit for driving the solid-state imaging device, wherein the drive unit performs at least one of 2-horizontal-pixels summation averaging reading driving in which imaging signals corresponding to charges generated in the photoelectric conversion elements of pixel cells of the same kind that are adjacent to each other in the same pixel cell row are summation-averaged by a summation averaging element, and a summation-averaged imaging signal is output from the solid-state imaging device; 4-pixels summation averaging reading driving in which charges are transferred simultaneously from the photoelectric conversion elements of two pixel cells sharing a charge storage member to the charge storage member corresponding to the photoelectric conversion elements and are thereby added together, imaging signals corresponding to addition result charges are summation-averaged by a summation averaging element, and a summation-averaged imaging signal is output from the solid-state imaging device; 2-diagonal-pixels summation reading driving in which charges are transferred simultaneously from the photoelectric conversion elements of two pixel cells sharing a charge storage member to the charge storage member corresponding to the photoelectric conversion elements and are thereby added together, and an imaging signal corresponding to an addition result charge is output from the solid-state imaging device; and all pixels reading driving in which signals corresponding to charges stored in the photoelectric conversion elements of the respective pixel cells are output individually.

In the disclosed imaging apparatus, the drive unit performs the 4-pixels summation averaging reading driving or the 2-horizontal-pixels summation averaging reading driving during moving image shooting, and performs at least the all pixels reading driving during still image shooting.

In the disclosed imaging apparatus, during still image shooting the drive unit performs one of the all pixels reading driving and at least one of the 2-horizontal-pixels summation averaging reading driving or the 2-diagonal-pixels summation reading driving and the 4-pixels summation averaging reading driving in accordance with a shooting ISO sensitivity or subject brightness.

In the disclosed imaging apparatus, two pixel cells of the same kind that are adjacent to each other in the same pixel cell row of the solid-state imaging device are to detect light beams that pass through different pupil regions of an imaging optical system which is disposed in front of the solid-state imaging device; and the drive unit performs the all pixels reading driving or the 2-diagonal-pixels summation reading driving during 3D image shooting, and performs the 2-horizontal-pixels summation averaging reading driving or the 4-pixels summation averaging reading driving during non-3D image shooting.

In the disclosed imaging apparatus, the drive unit performs the 2-diagonal-pixels summation reading driving during 3D moving image shooting, performs the all pixels reading driving or the 2-diagonal-pixels summation reading driving during 3D still image shooting, performs the 4-pixels summation averaging reading driving during non-3D moving image shooting, and performs the 2-horizontal-pixels summation averaging reading driving or the 4-pixels summation averaging reading driving during non-3D still image shooting.

In the disclosed imaging apparatus, the drive unit further performs exposure time difference driving in which the exposure time is switched between the pixel cells belonging to the first pixel cell group and the pixel cells belonging to the second pixel cell group; and 2-horizontal-pixels summation 2-field reading driving in which the 2-horizontal-pixels summation averaging reading driving is performed on the first pixel cell group or the second pixel cell group and a resulting shot image signal is output from the solid-state imaging device, and then the 2-horizontal-pixels summation averaging reading driving is performed on the second pixel cell group or the first pixel cell group and a resulting shot image signal is output from the solid-state imaging device.

In the disclosed imaging apparatus, the drive unit is to further perform exposure time difference driving in which the exposure time is switched between the pixel cells belonging to the first pixel cell group and the pixel cells belonging to the second pixel cell group; 2-horizontal-pixels summation 2-field reading driving in which the 2-horizontal-pixels summation averaging reading driving is performed on the first pixel cell group or the second pixel cell group and a resulting shot image signal is output from the solid-state imaging device, and then the 2-horizontal-pixels summation averaging reading driving is performed on the second pixel cell group or the first pixel cell group and a resulting shot image signal is output from the solid-state imaging device; and all pixels 2-field reading driving in which a shot image signal acquired from the first pixel cell group or the second pixel cell group is first output from the solid-state imaging device and then a shot image signal acquired from the second pixel cell group or the first pixel cell group is output from the solid-state imaging device; and the drive unit performs the exposure time difference driving and the all pixels 2-field reading driving during 3D still image shooting if a subject has a brightness difference that is larger than a prescribed value, and performs the exposure time difference driving and the 2-horizontal-pixels summation 2-field reading driving during non-3D still image shooting if the subject has a brightness difference that is larger than the prescribed value.

The disclosed driving method of a solid-state imaging device is a driving method of the above solid-state imaging device, wherein the driving method performs at least one of 2-horizontal-pixels summation averaging reading driving in which imaging signals corresponding to charges generated in the photoelectric conversion elements of pixel cells of the same kind that are adjacent to each other in the same pixel cell row are added together are summation-averaged by a summation averaging element, and a summation-averaged imaging signal is output from the solid-state imaging device; 4-pixels summation averaging reading driving in which charges are transferred simultaneously from the photoelectric conversion elements of two pixel cells sharing a charge storage member to the charge storage member corresponding to the photoelectric conversion elements and are thereby added together, imaging signals corresponding to addition result charges are summation-averaged, and a summation-averaged imaging signal is output from the solid-state imaging device; 2-diagonal-pixels summation reading driving in which charges are transferred simultaneously from the photoelectric conversion elements of two pixel cells sharing a charge storage member to the charge storage member corresponding to the photoelectric conversion elements and are thereby added together, and an imaging signal corresponding to an addition result charge is output from the solid-state imaging device; and all pixels reading driving in which signals corresponding to charges stored in the photoelectric conversion elements of the respective pixel cells are output individually.

INDUSTRIAL APPLICABILITY

The invention makes it possible to provide an imaging apparatus which can realize both of high-image-quality moving image shooting and high-image-quality still image shooting.

Although the invention has been described above using the particular embodiment, the invention is not limited to this embodiment and various modifications are possible without departing from the disclosed technical idea of the invention.

The present application is based on Japanese Patent Application No. 2012-074310 filed on Mar. 28, 2012, the disclosure of which is incorporated herein.

DESCRIPTION OF SYMBOLS

5: Solid-state imaging device
50: Pixel cell area
51: Vertical scanning circuit
52: Horizontal scanning circuit
53: Pixel cell

The invention claimed is:

1. A solid-state imaging device in which plural pixel cells comprising G pixel cells each comprising a photoelectric conversion element for detecting green light, R pixel cells each comprising a photoelectric conversion element for detecting red light, and B pixel cells each comprising a photoelectric conversion element for detecting blue light are arranged two-dimensionally, wherein:

the plural pixel cells are arranged in such a manner that pixel cell rows each consisting of plural pixel cells arranged in a row direction at a constant pitch are arranged in a column direction which is perpendicular to the row direction;

odd-numbered pixel cell rows are deviated from even-numbered pixel cell rows in the row direction by the pixel cell arrangement pitch in the row direction;

in each of a first pixel cell group consisting of pixel cells belonging to odd-numbered rows and a second pixel cell group consisting of pixel cells belonging to even-numbered rows, first pixel cell rows in each of which sets of two G pixel cells and sets of two R pixel cells are arranged alternately in the row direction and second pixel cell rows in each of which sets of two B pixel cells and sets of two G pixel cells are arranged alternately in the row direction are arranged alternately in the column direction;

in each of the first pixel cell group and the second pixel cell group, among the pixel cells belonging to the second pixel cell rows, the G pixel cells are located at positions corresponding to positions of the respective R pixel cells belonging to the first pixel cell rows and the B pixel cells are located at positions corresponding to positions of the respective G pixel cells belonging to the first pixel cell rows;

in each of a pair of first pixel cell rows that are adjacent to each other in the column direction and a pair of second pixel cell rows that are adjacent to each other in the column direction, a pixel cell of the same kind as each pixel cell concerned is located at a position that is deviated in the row direction by the pixel cell arrangement pitch in the row direction and deviated in the column direction by the pixel cell arrangement pitch in the column direction from the pixel cell concerned;

the pixel cell concerned and the pixel cell of the same kind as the pixel cell concerned constitute a pixel cell pair; and the solid-state imaging device comprises charge storage members which are provided so as to correspond to the respective pixel cells and store charges generated in the photoelectric conversion elements of the respective pixel cells, and signal output circuits which output signals corresponding to the charges stored in the respective pixel charge storage members, and the charge storage member and the signal output circuit corresponding to each pixel cell belonging to the first pixel cell group are commonized with the charge storage member and the signal output circuit corresponding to a pixel cell that is paired with the pixel cell belonging to the first pixel cell group, respectively.

2. The solid-state imaging device according to claim 1, further comprising summation averaging elements for summation-averaging signals that are output from signal output circuits corresponding to pixel cells of the same kind that are adjacent to each other in the row direction.

3. The solid-state imaging device according to claim 1, wherein two pixel cells of the same kind that are adjacent to each other in the same pixel cell row are to detect light beams that pass through different pupil regions of an imaging optical system which is disposed in front of the solid-state imaging device.

4. The solid-state imaging device according to claim 3, wherein an approximately circular microlens is disposed over the photoelectric conversion elements of the two respective pixel cells of the same kind so as to cover the two photoelectric conversion elements.

5. An imaging apparatus comprising:
the solid-state imaging device according to claim 2; and
a drive unit for driving the solid-state imaging device,
wherein the drive unit performs at least one of:
2-horizontal-pixels summation averaging reading driving in which imaging signals corresponding to charges generated in the photoelectric conversion elements of pixel cells of the same kind that are adjacent to each other in the same pixel cell row are summation-averaged by a summation averaging element, and a summation-averaged imaging signal is output from the solid-state imaging device;
4-pixels summation averaging reading driving in which charges are transferred simultaneously from the photoelectric conversion elements of two pixel cells sharing a charge storage member to the charge storage member corresponding to the photoelectric conversion elements and are thereby added together, imaging signals corresponding to addition result charges are summation-averaged by a summation averaging element, and a summation-averaged imaging signal is output from the solid-state imaging device;
2-diagonal-pixels summation reading driving in which charges are transferred simultaneously from the photoelectric conversion elements of two pixel cells sharing a charge storage member to the charge storage member corresponding to the photoelectric conversion elements and are thereby added together, and an imaging signal corresponding to an addition result charge is output from the solid-state imaging device; and
all pixels reading driving in which signals corresponding to charges stored in the photoelectric conversion elements of the respective pixel cells are output individually.

6. The imaging apparatus according to claim 5, wherein the drive unit performs the 4-pixels summation averaging reading driving or the 2-horizontal-pixels summation averaging reading driving during moving image shooting, and performs at least the all pixels reading driving during still image shooting.

7. The imaging apparatus according to claim 5, wherein during still image shooting the drive unit performs one of the all pixels reading driving and at least one of the 2-horizontal-pixels summation averaging reading driving or the 2-diagonal-pixels summation reading driving and the 4-pixels summation averaging reading driving in accordance with a shooting ISO sensitivity or subject brightness.

8. The imaging apparatus according to claim 5, wherein:
two pixel cells of the same kind that are adjacent to each other in the same pixel cell row of the solid-state imaging device are to detect light beams that pass through different pupil regions of an imaging optical system which is disposed in front of the solid-state imaging device; and
the drive unit performs the all pixels reading driving or the 2-diagonal-pixels summation reading driving during 3D image shooting, and performs the 2-horizontal-pixels summation averaging reading driving or the 4-pixels summation averaging reading driving during non-3D image shooting.

9. The imaging apparatus according to claim 8, wherein:
the drive unit performs the 2-diagonal-pixels summation reading driving during 3D moving image shooting, performs the all pixels reading driving or the 2-diagonal-pixels summation reading driving during 3D still image shooting, performs the 4-pixels summation averaging reading driving during non-3D moving image shooting, and performs the 2-horizontal-pixels summation averaging reading driving or the 4-pixels summation averaging reading driving during non-3D still image shooting.

10. The imaging apparatus according to claim 5, wherein the drive unit further performs exposure time difference driving in which the exposure time is switched between the pixel cells belonging to the first pixel cell group and the pixel cells belonging to the second pixel cell group; and 2-horizontal-pixels summation 2-field reading driving in which the 2-horizontal-pixels summation averaging reading driving is performed on the first pixel cell group or the second pixel cell group and a resulting shot image signal is output from the solid-state imaging device, and then the 2-horizontal-pixels summation averaging reading driving is performed on the second pixel cell group or the first pixel cell group and a resulting shot image signal is output from the solid-state imaging device.

11. The imaging apparatus according to claim 8, wherein:
the drive unit is to further perform exposure time difference driving in which the exposure time is switched between the pixel cells belonging to the first pixel cell group and the pixel cells belonging to the second pixel cell group; 2-horizontal-pixels summation 2-field reading driving in which the 2-horizontal-pixels summation averaging reading driving is performed on the first pixel cell group or the second pixel cell group and a resulting shot image signal is output from the solid-state imaging device, and then the 2-horizontal-pixels summation averaging reading driving is performed on the second pixel cell group or the first pixel cell group and a resulting shot image signal is output from the solid-state imaging device; and
all pixels 2-field reading driving in which a shot image signal acquired from the first pixel cell group or the second pixel cell group is first output from the solid-state imaging device and then a shot image signal acquired from the second pixel cell group or the first pixel cell group is output from the solid-state imaging device; and
the drive unit performs the exposure time difference driving and the all pixels 2-field reading driving during 3D still image shooting if a subject has a brightness difference that is larger than a prescribed value, and performs the exposure time difference driving and the 2-horizontal-pixels summation 2-field reading driving during non-3D still image shooting if the subject has a brightness difference that is larger than the prescribed value.

12. A driving method of the solid-state imaging device according to claim 2, wherein the driving method performs at least one of:
2-horizontal-pixels summation averaging reading driving in which imaging signals corresponding to charges generated in the photoelectric conversion elements of pixel cells of the same kind that are adjacent to each other in the same pixel cell row are added together are summation-averaged by a summation averaging element, and a summation-averaged imaging signal is output from the solid-state imaging device;
4-pixels summation averaging reading driving in which charges are transferred simultaneously from the photoelectric conversion elements of two pixel cells sharing a charge storage member to the charge storage member corresponding to the photoelectric conversion elements and are thereby added together, imaging signals corresponding to addition result charges are summation-averaged, and a summation-averaged imaging signal is output from the solid-state imaging device;
2-diagonal-pixels summation reading driving in which charges are transferred simultaneously from the photoelectric conversion elements of two pixel cells sharing a charge storage member to the charge storage member corresponding to the photoelectric conversion elements and are thereby added together, and an imaging signal corresponding to an addition result charge is output from the solid-state imaging device; and all pixels reading driving in which signals corresponding to charges stored in the photoelectric conversion elements of the respective pixel cells are output individually.

\* \* \* \* \*